(12) United States Patent
Gwon et al.

(10) Patent No.: US 11,718,265 B2
(45) Date of Patent: Aug. 8, 2023

(54) VEHICULAR AIRBAG DEVICE

(71) Applicant: Autoliv Development AB, Vargarda (SE)

(72) Inventors: Tae Ik Gwon, Hwaseong-si (KR); Jong Ki Byun, Hwaseong-si (KR); Dae Chang Jung, Hwaseong-si (KR)

(73) Assignee: Autoliv Development AB, Vargarda (SE)

( * ) Notice: Subject to any disclaimer, the term of this patent is extended or adjusted under 35 U.S.C. 154(b) by 75 days.

(21) Appl. No.: 17/286,144

(22) PCT Filed: Oct. 11, 2019

(86) PCT No.: PCT/KR2019/013329
§ 371 (c)(1),
(2) Date: Apr. 16, 2021

(87) PCT Pub. No.: WO2020/080747
PCT Pub. Date: Apr. 23, 2020

(65) Prior Publication Data
US 2021/0370863 A1     Dec. 2, 2021

(30) Foreign Application Priority Data

Oct. 19, 2018 (KR) .................. 10-2018-0125401
Jun. 20, 2019 (KR) .................. 10-2019-0073680

(51) Int. Cl.
*B60R 21/233* (2006.01)
*B60R 21/207* (2006.01)
(Continued)

(52) U.S. Cl.
CPC .......... *B60R 21/233* (2013.01); *B60R 21/207* (2013.01); *B60R 21/2338* (2013.01); *B60R 21/264* (2013.01)

(58) Field of Classification Search
CPC . B60R 21/233; B60R 21/207; B60R 21/2338; B60R 21/264
See application file for complete search history.

(56) References Cited

U.S. PATENT DOCUMENTS 10,967,826 B2 * 4/2021 Henriksson ....... B60R 21/23138
2018/0118150 A1 * 5/2018 Kwon ................... B60R 21/216
(Continued)

FOREIGN PATENT DOCUMENTS

EP       2979934 B1 * 5/2019 ........... B60R 21/207
JP    2012-051557 A    3/2012
(Continued)

*Primary Examiner* — James A English
*Assistant Examiner* — Matthew James O'Neill
(74) *Attorney, Agent, or Firm* — Harness, Dickey & Pierce, P.L.C.; Stephen T. Olson

(57) ABSTRACT

The present invention relates to a vehicular airbag device provided with a configuration comprising: an airbag cushion which is formed in a shawl shape so as to surround and restrict the entire upper body around both shoulders of an occupant as well as the abdominal and pelvic regions in the event of a vehicle collision, and deployed toward both side surfaces of the occupant; and a limiting means which is installed in first and second cushions of the airbag cushion deployed at both sides of the occupant, and provides a supporting force and limits the deployment shape of the first and second cushions at the time of deployment of the first and second cushions. According to the present invention, both side surfaces and the front surface of the occupant are efficiently restricted by improving the lateral strength of the airbag cushion to safely protect the occupant in the event of a vehicle collision.

8 Claims, 27 Drawing Sheets

(51) Int. Cl.
*B60R 21/2338* (2011.01)
*B60R 21/264* (2006.01)

(56) References Cited

U.S. PATENT DOCUMENTS

| | | | |
|---|---|---|---|
| 2018/0194317 A1* | 7/2018 | Barbat | B60R 21/207 |
| 2019/0061675 A1* | 2/2019 | Kwon | B60R 21/261 |
| 2019/0299916 A1* | 10/2019 | Kanegae | B60R 21/01512 |
| 2021/0061215 A1* | 3/2021 | Debler | B60R 21/2338 |

FOREIGN PATENT DOCUMENTS

| | | |
|---|---|---|
| JP | 2016-030538 A | 3/2016 |
| KR | 10-1611087 B1 | 4/2016 |
| KR | 10-1655569 B1 | 9/2016 |
| KR | 10-2017-0036014 A | 3/2017 |
| KR | 10-2018-0049404 A | 5/2018 |

* cited by examiner

[FIG. 1]
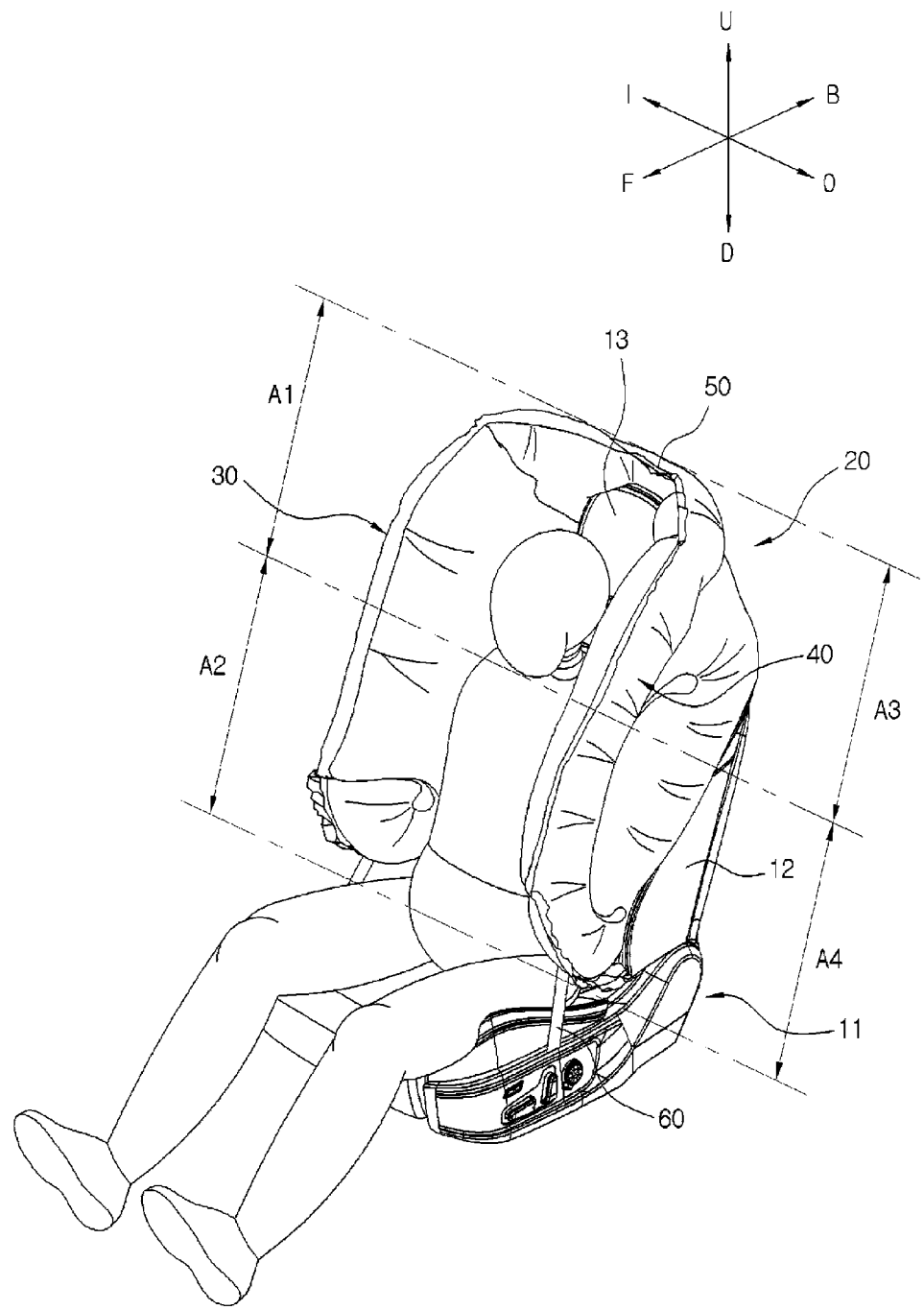

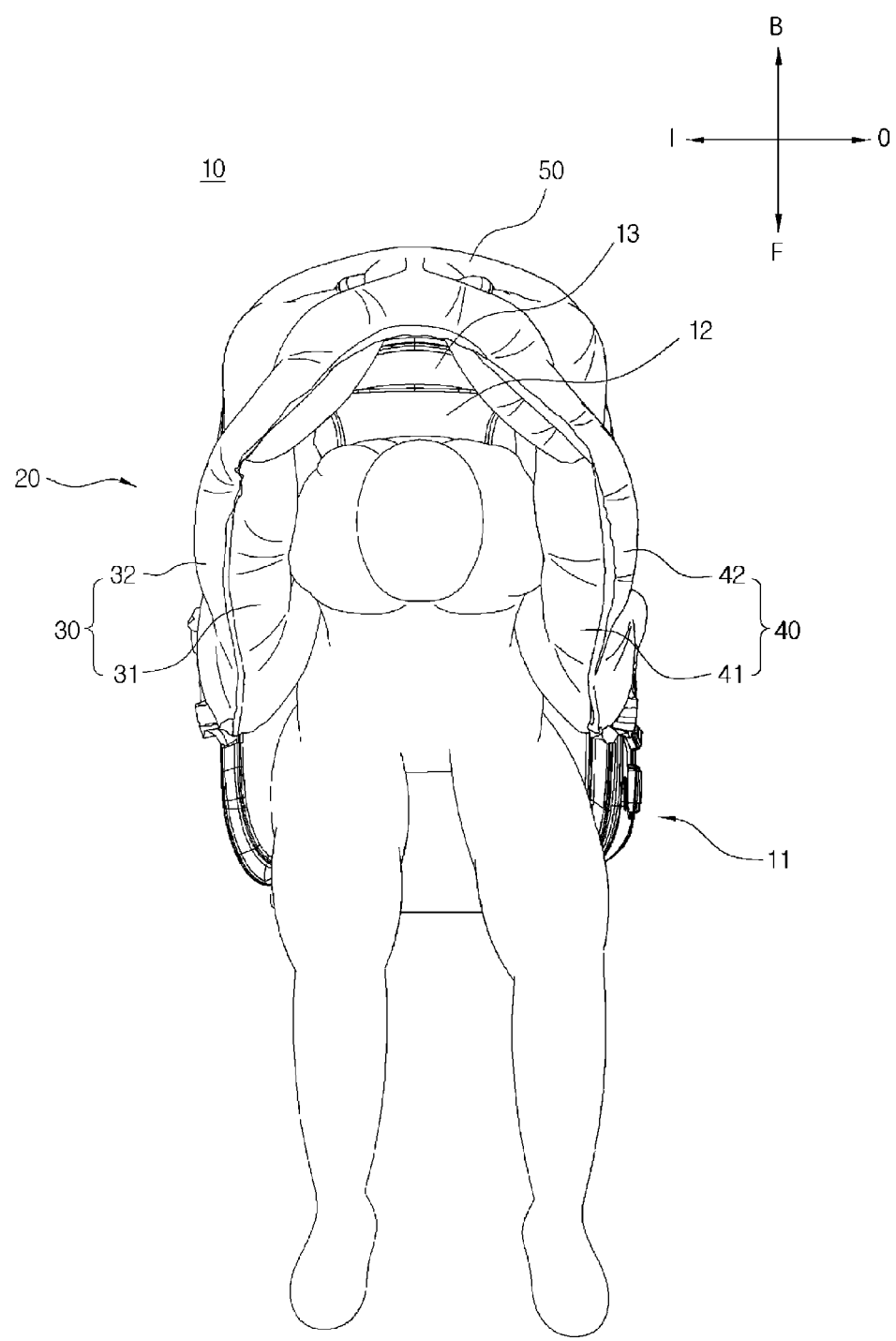
[FIG. 2]

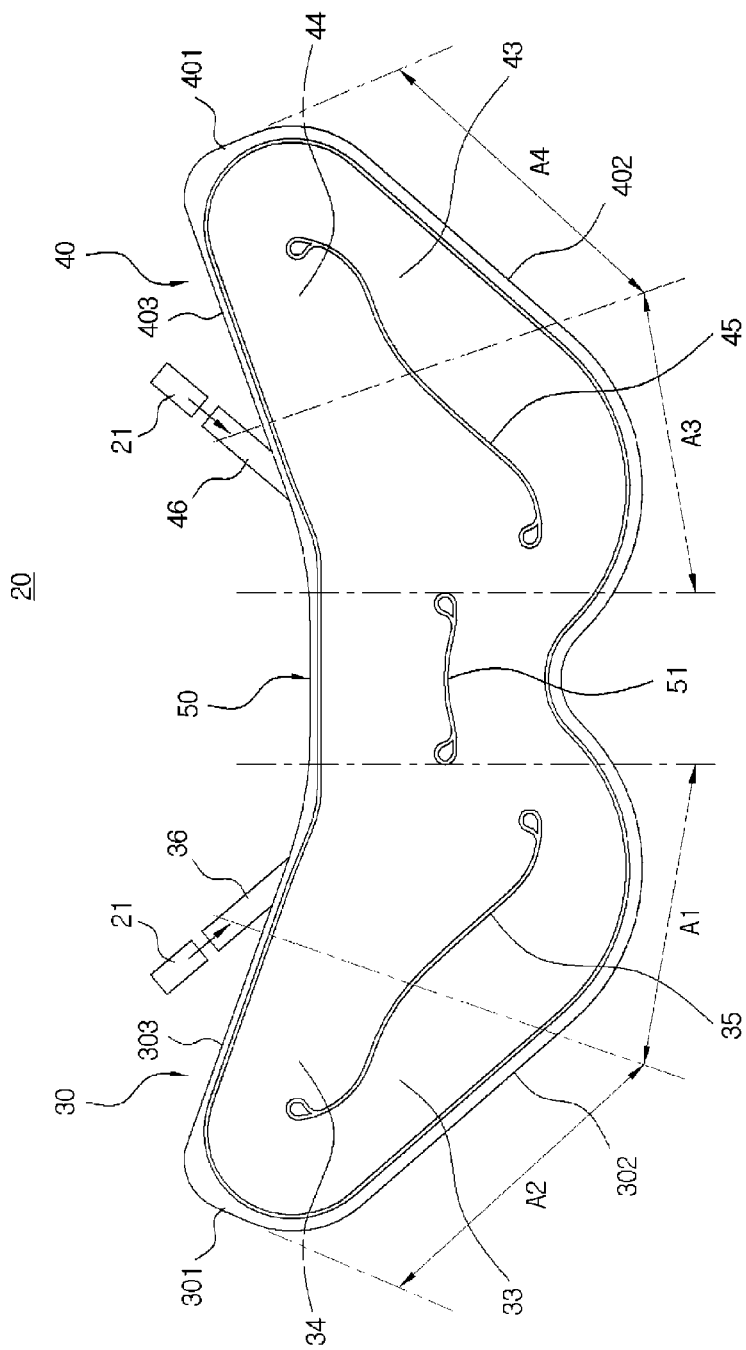
[FIG. 3]

[FIG. 4]
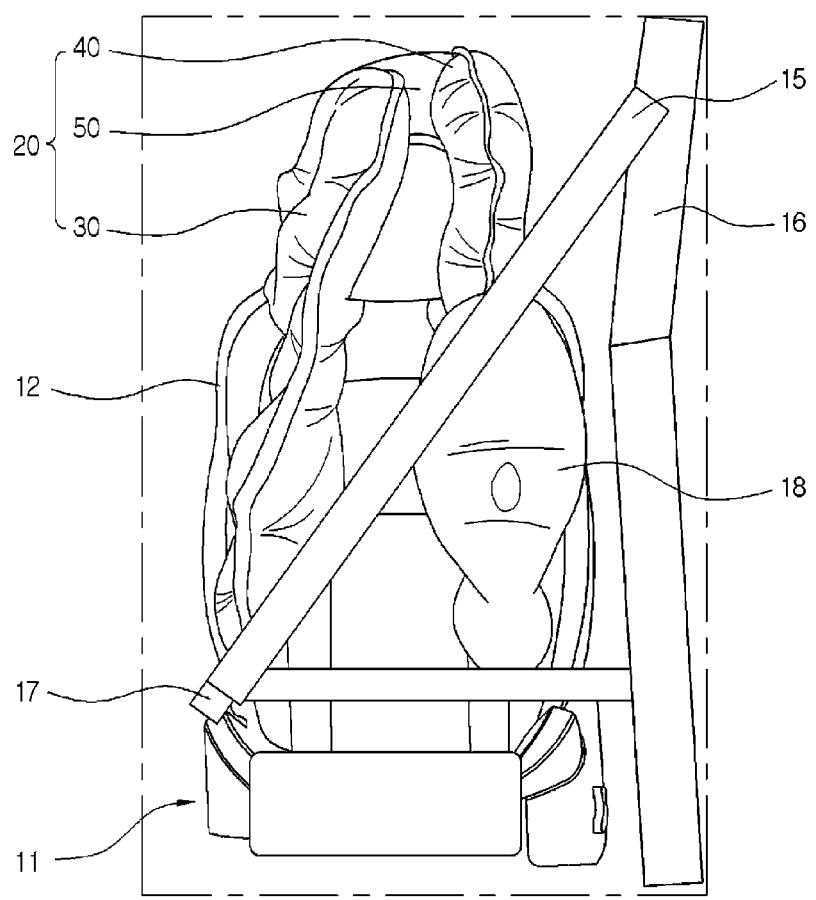

[FIG. 5]
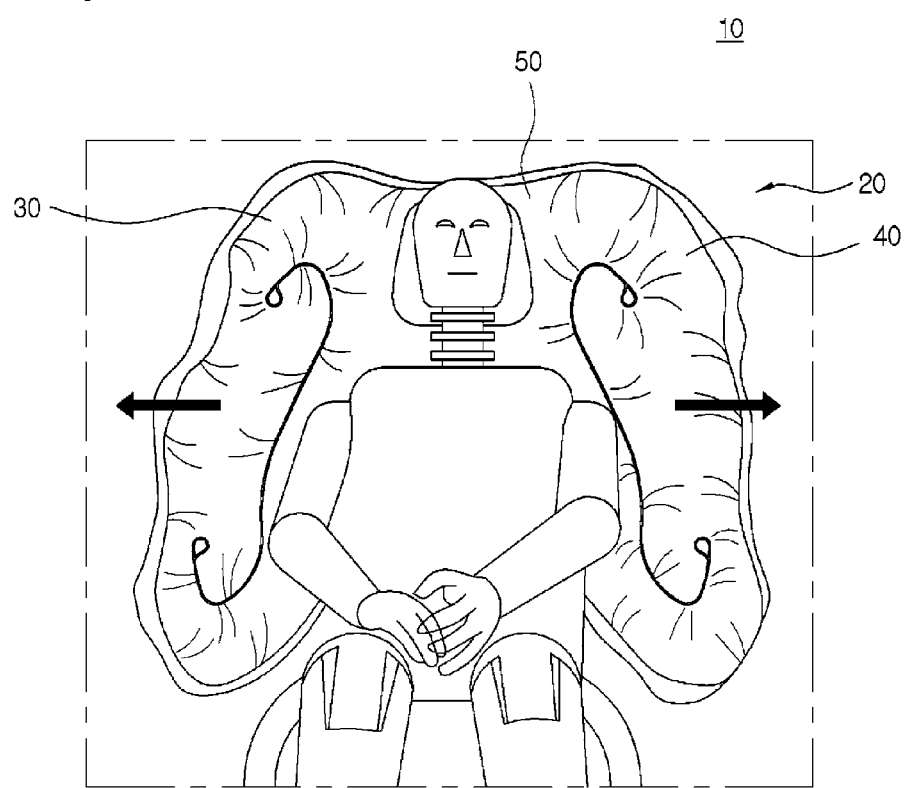

[FIG. 6]
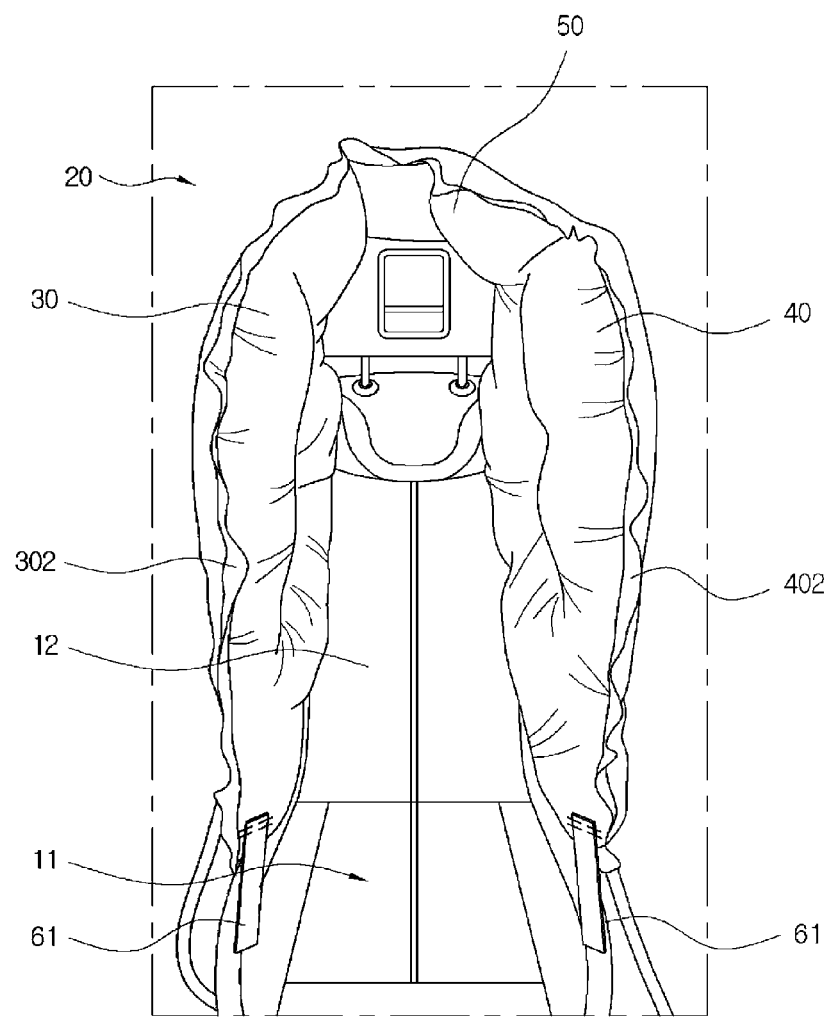

[FIG. 7]
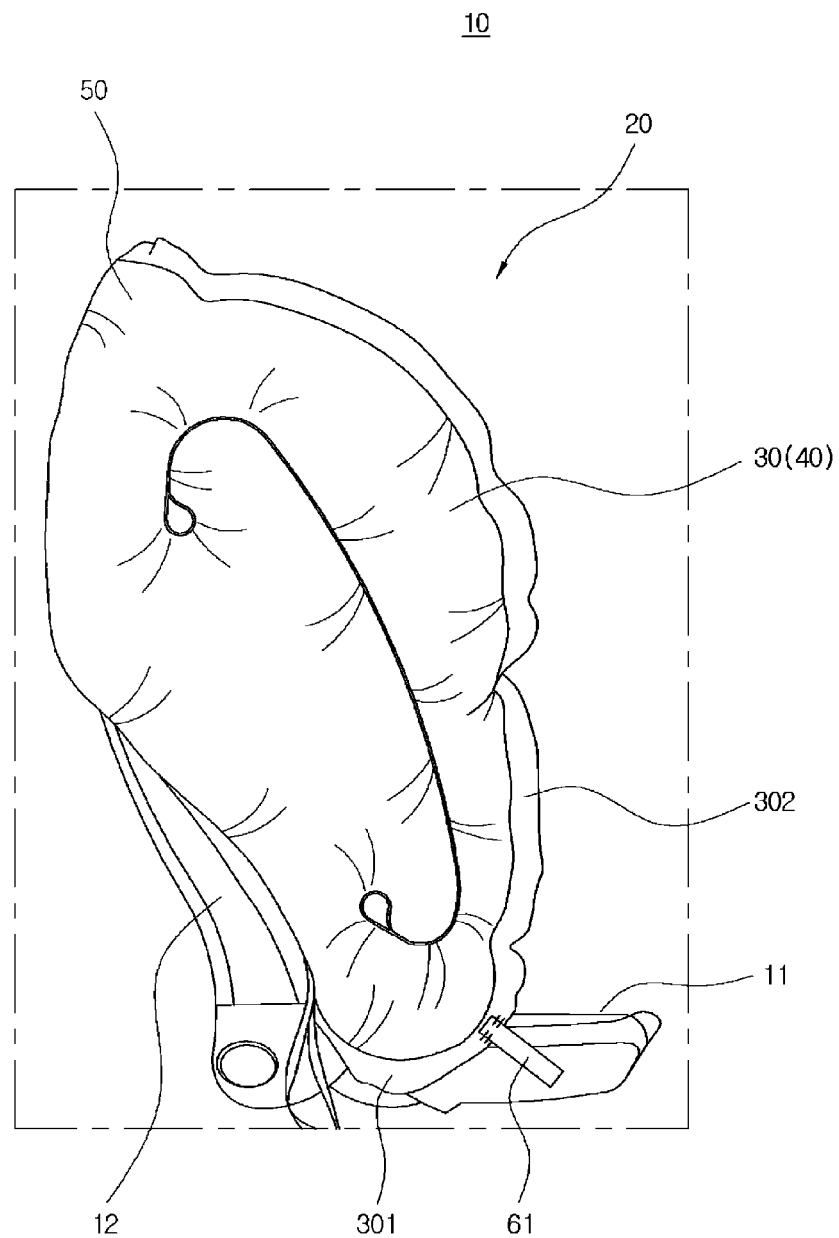

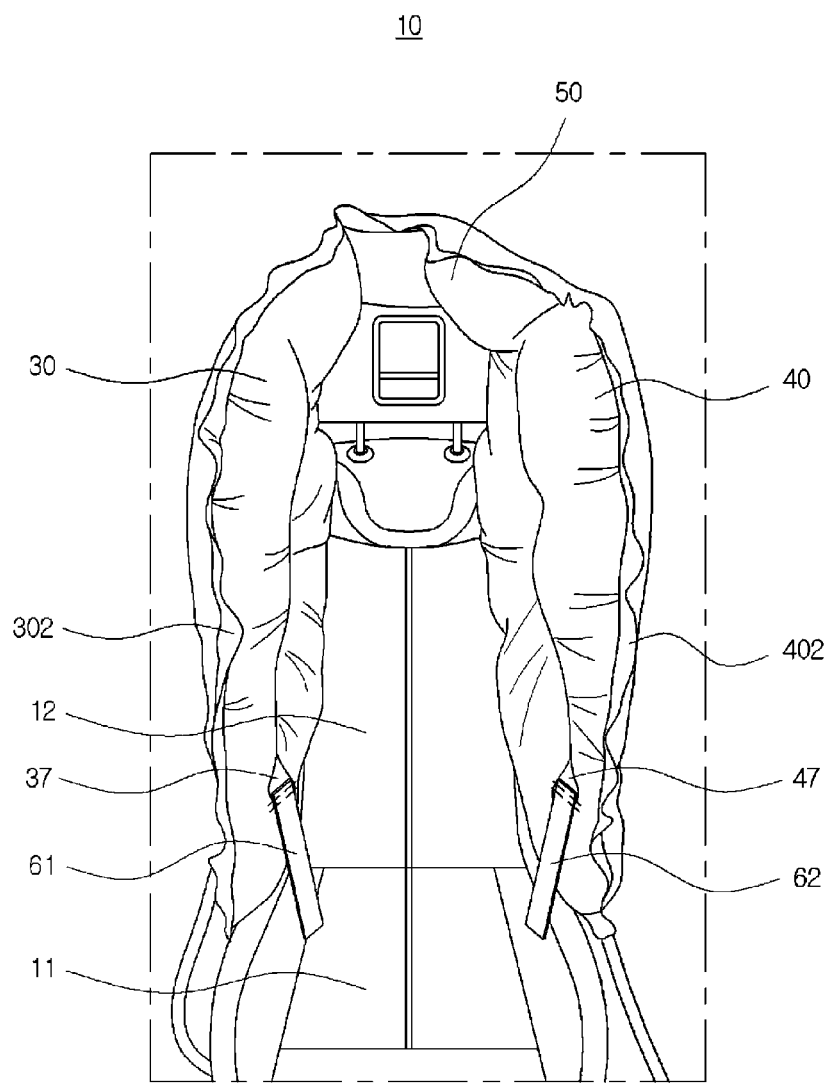
[FIG. 8]

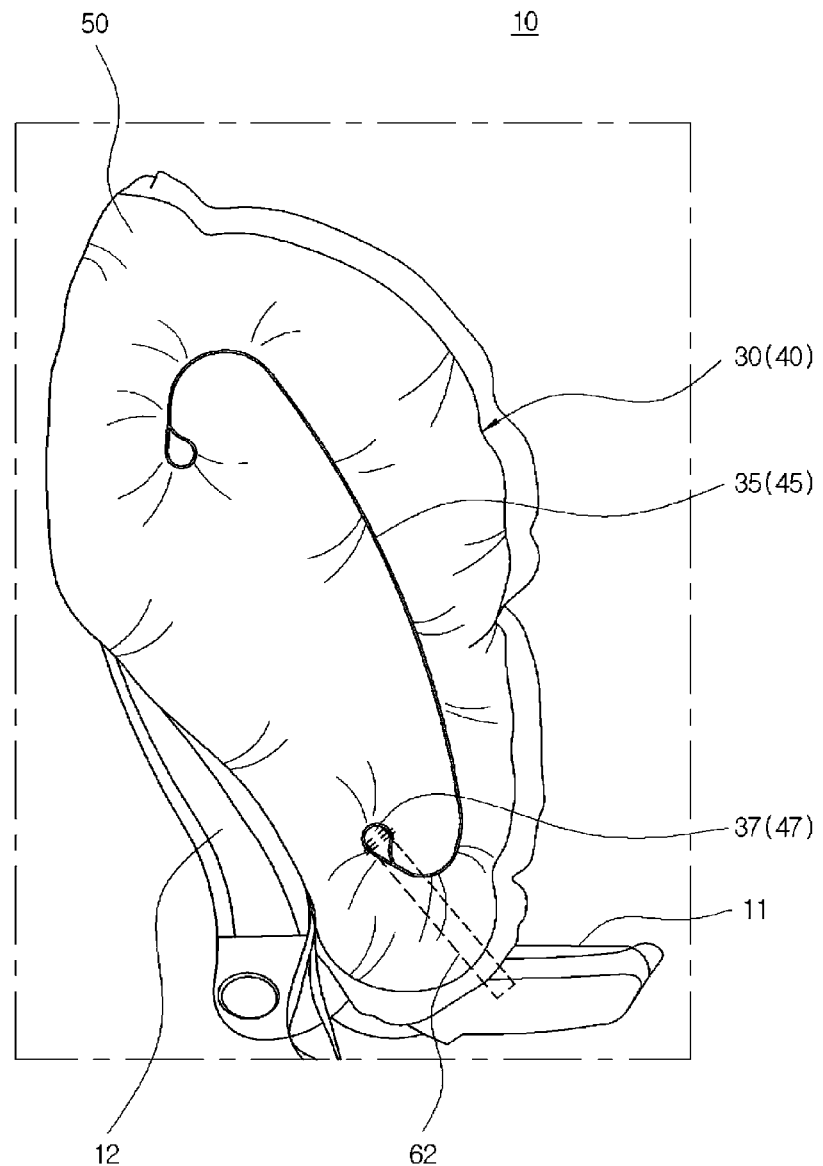
[FIG. 9]

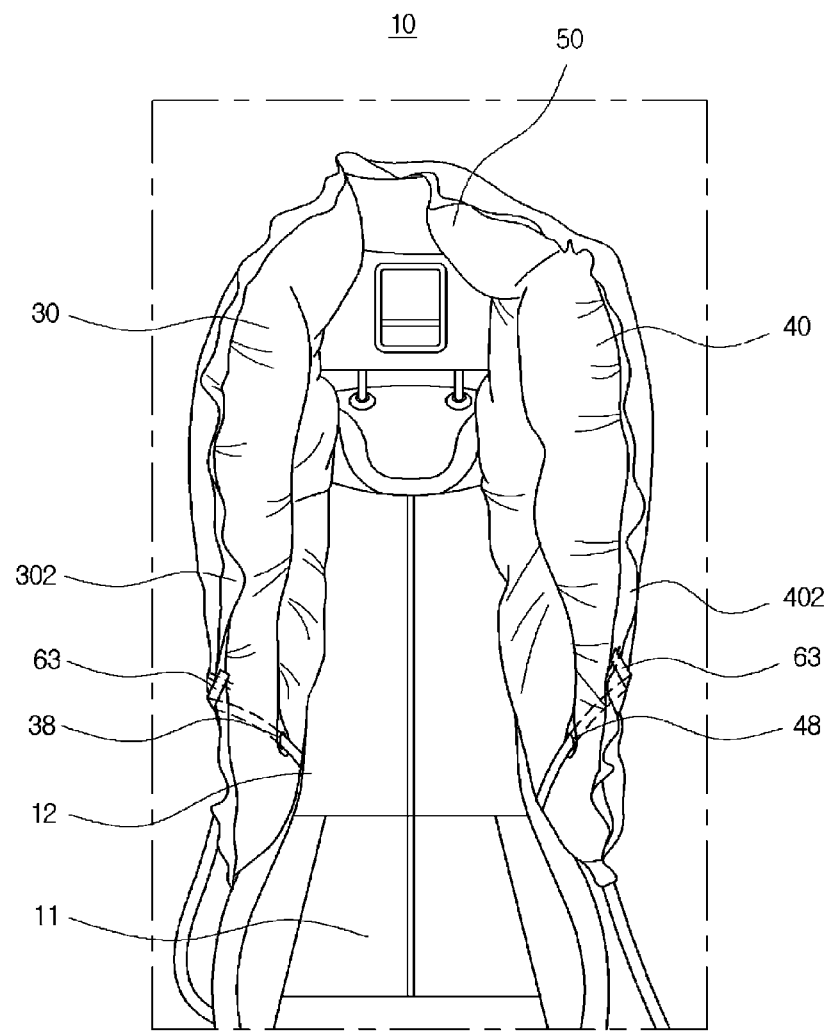
[FIG. 10]

[FIG. 11]
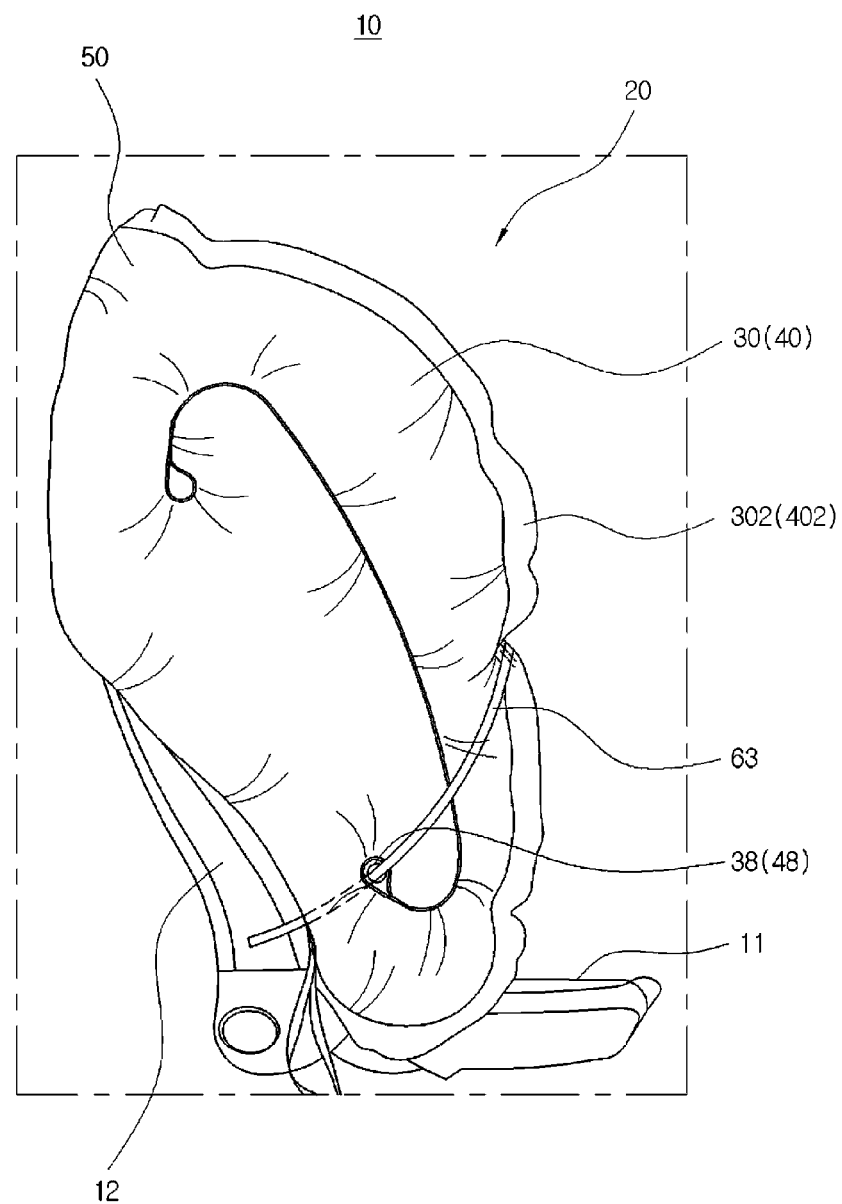

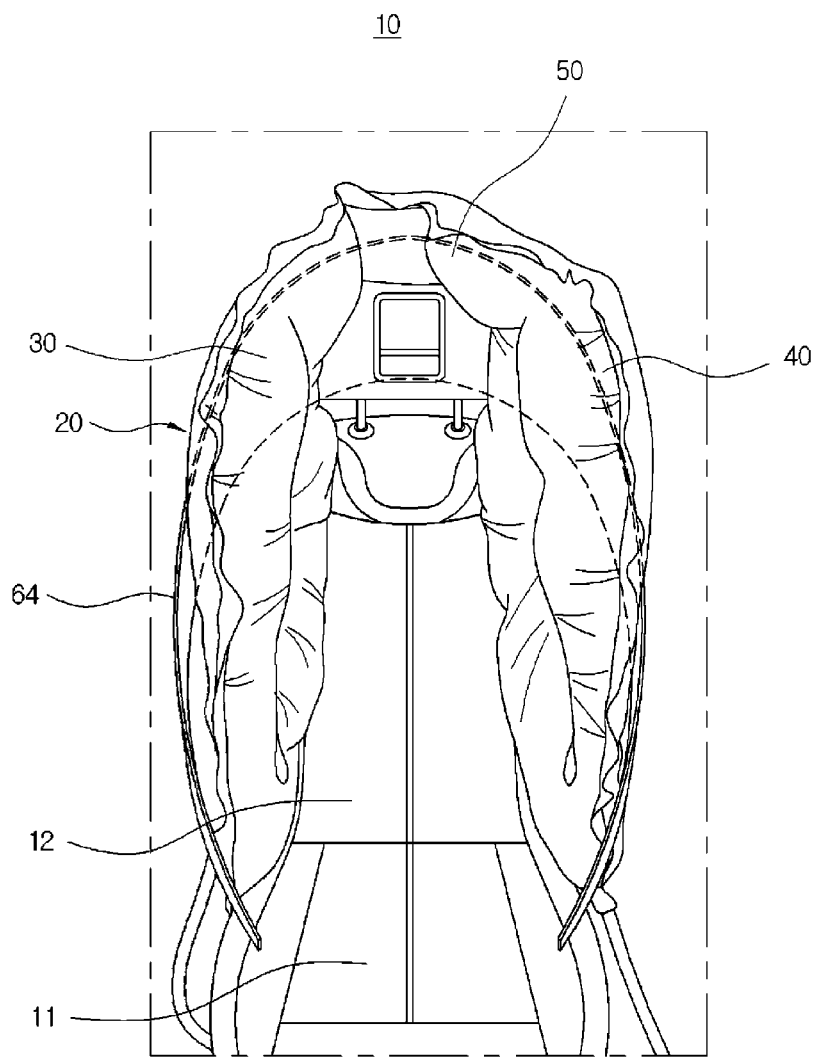
[FIG. 12]

[FIG. 13]
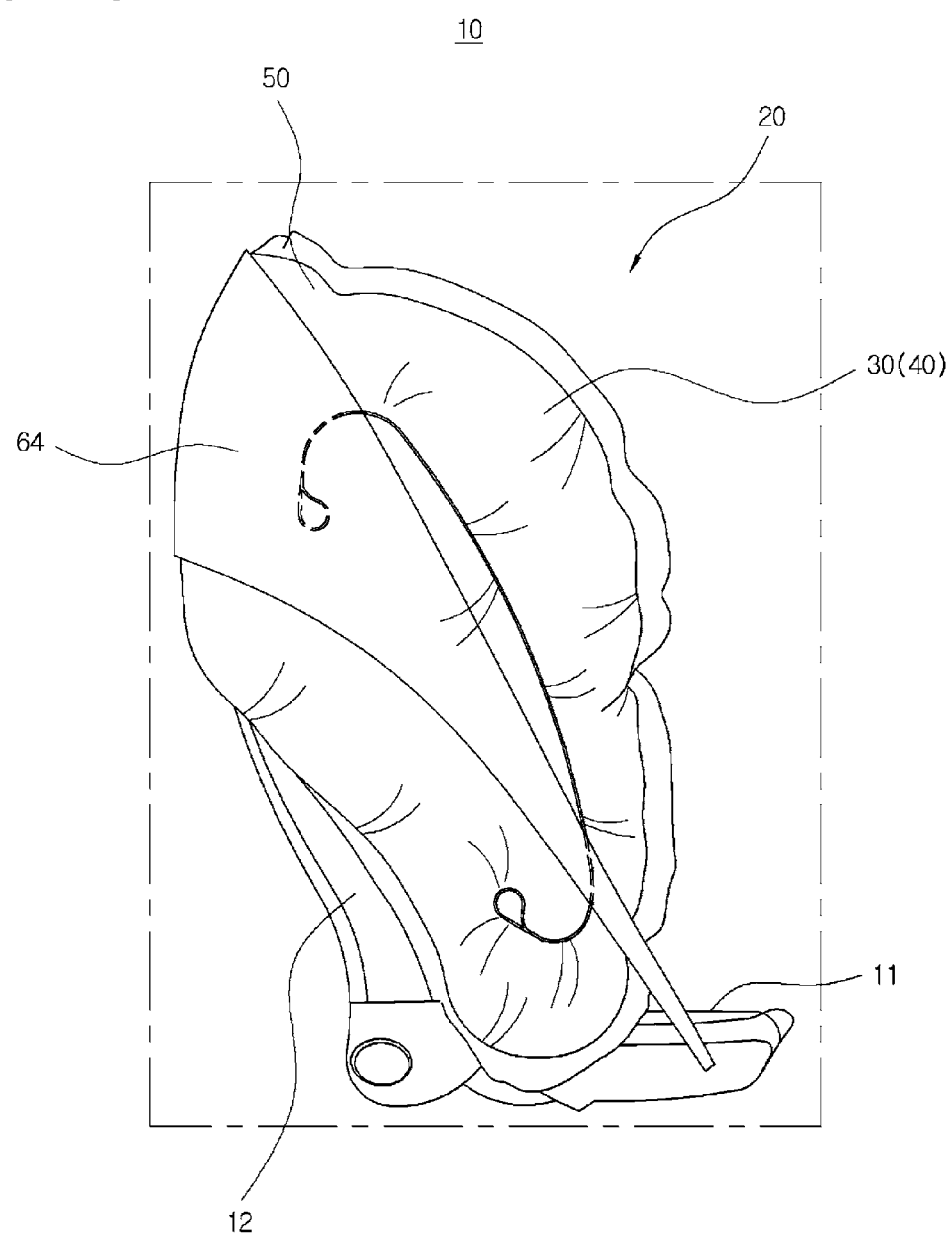

[FIG. 14]
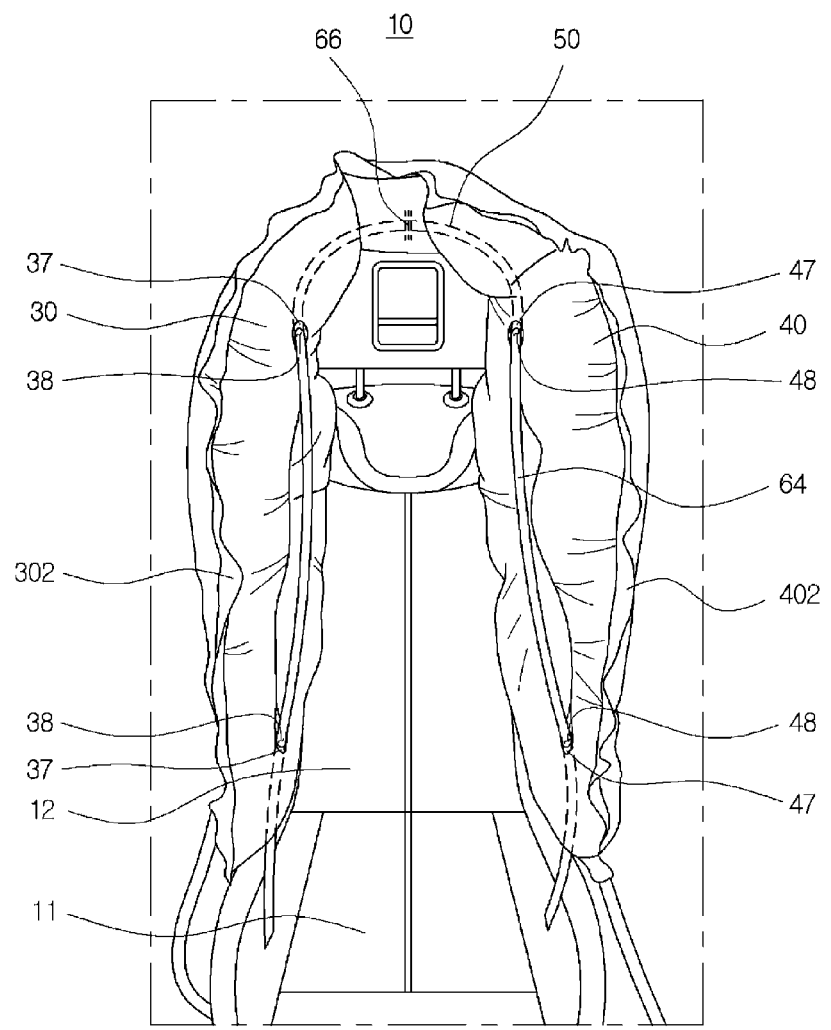

[FIG. 15]
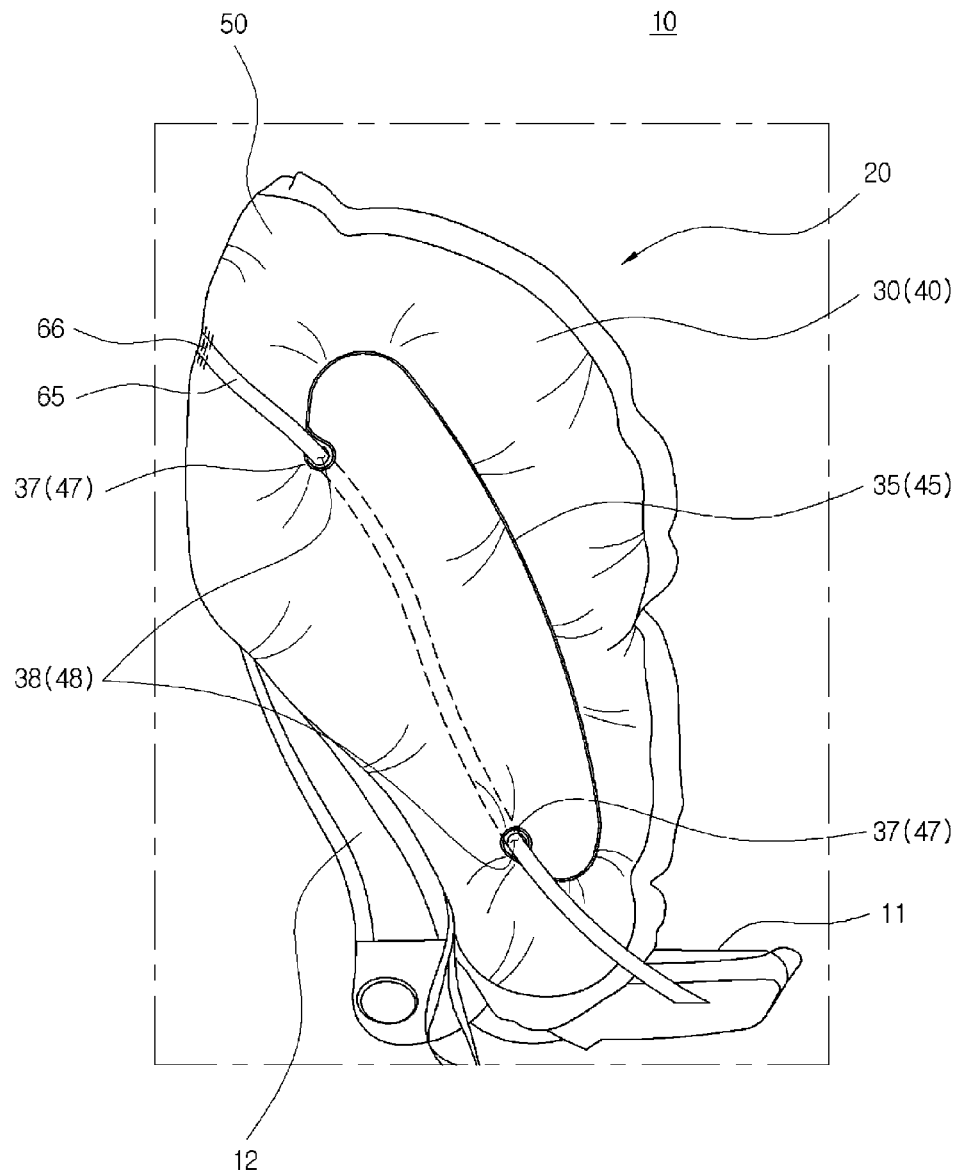

[FIG. 16]
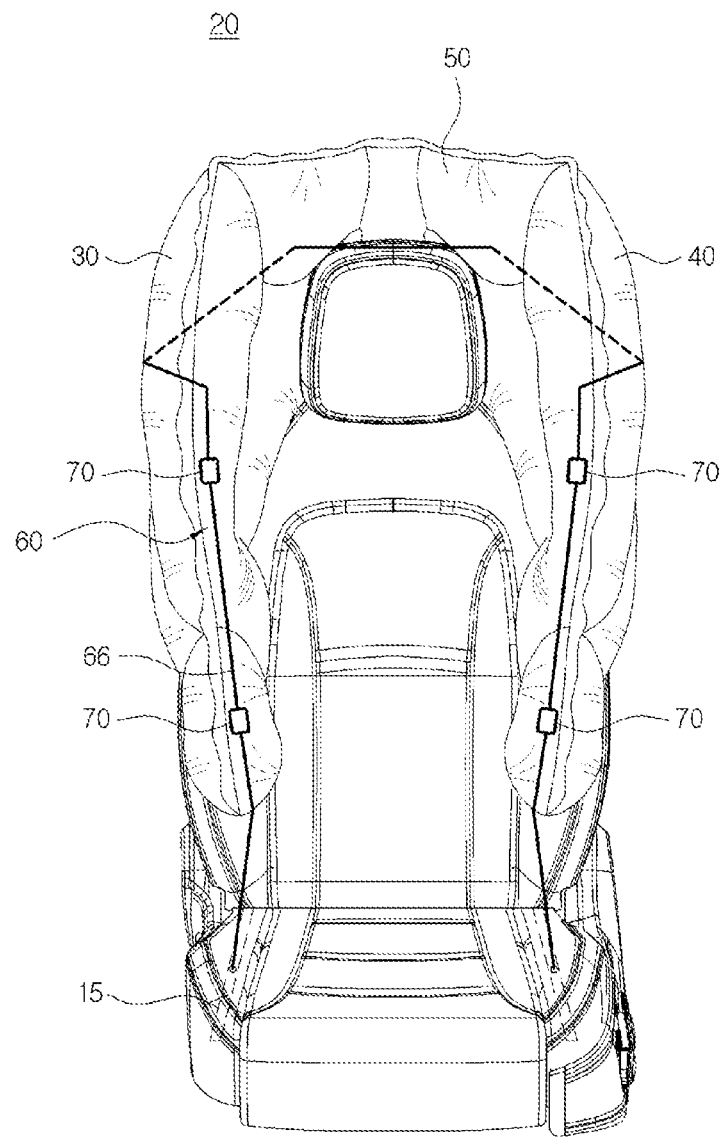

[FIG. 17]
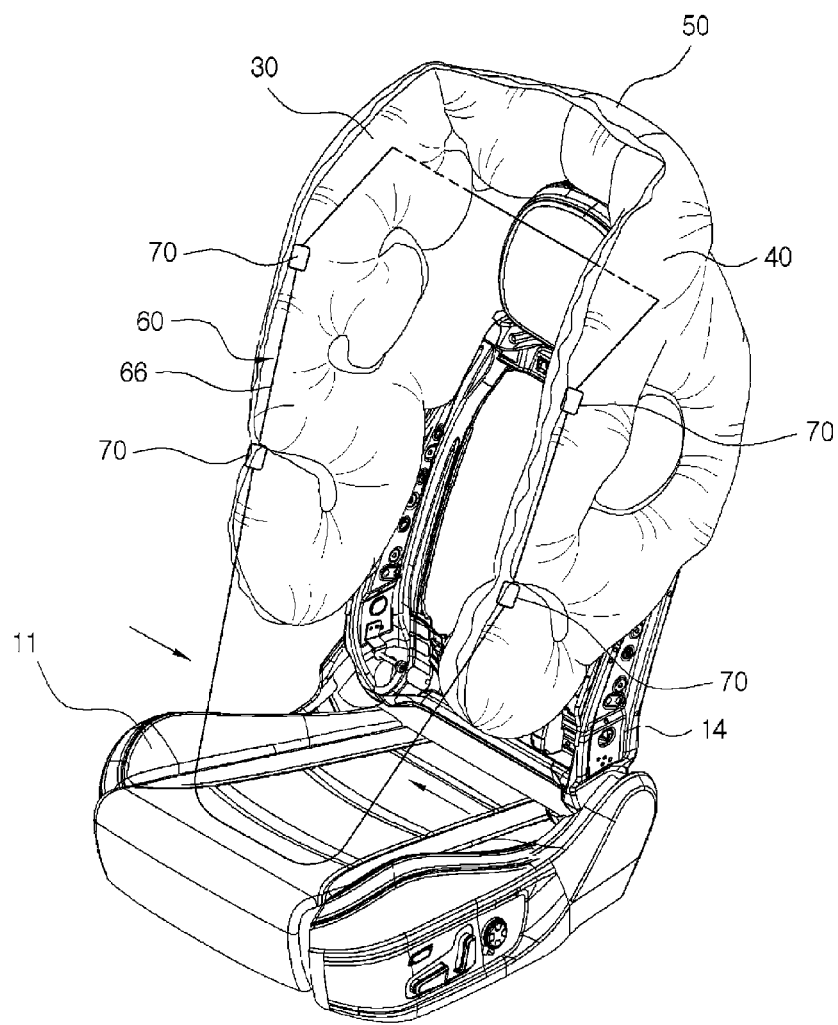

[FIG. 18]
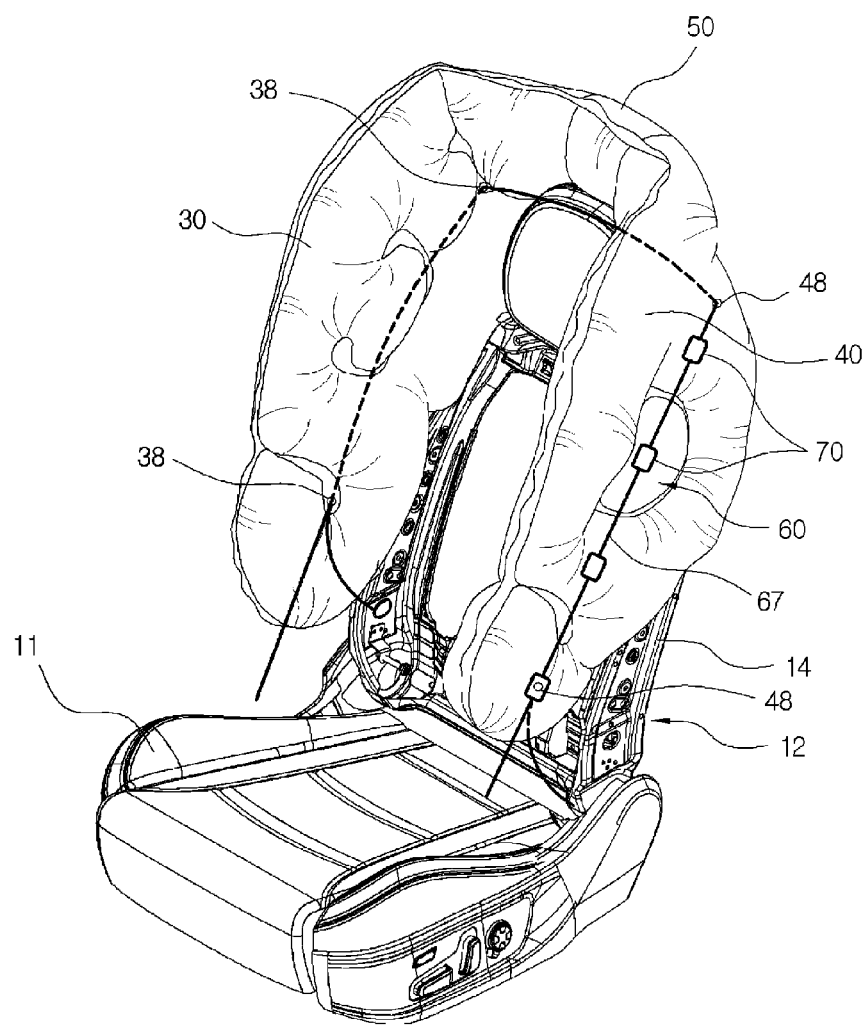

[FIG. 19]
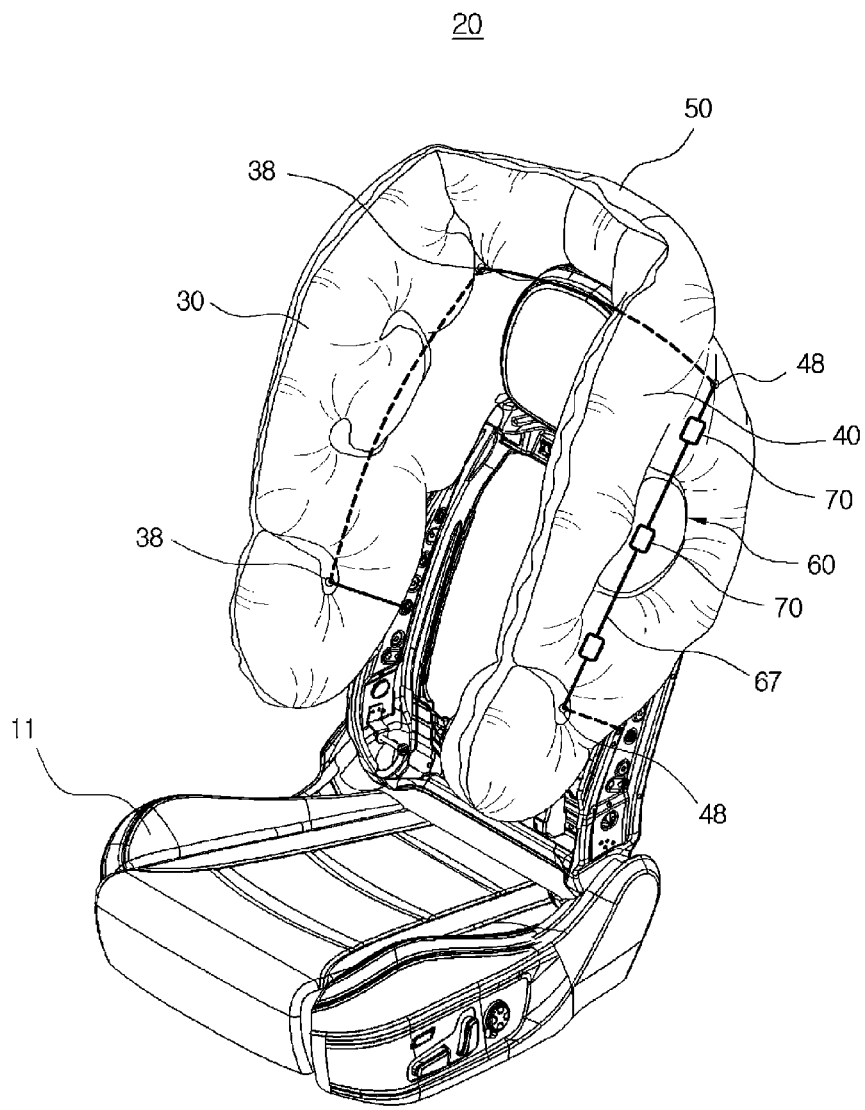

[FIG. 20]
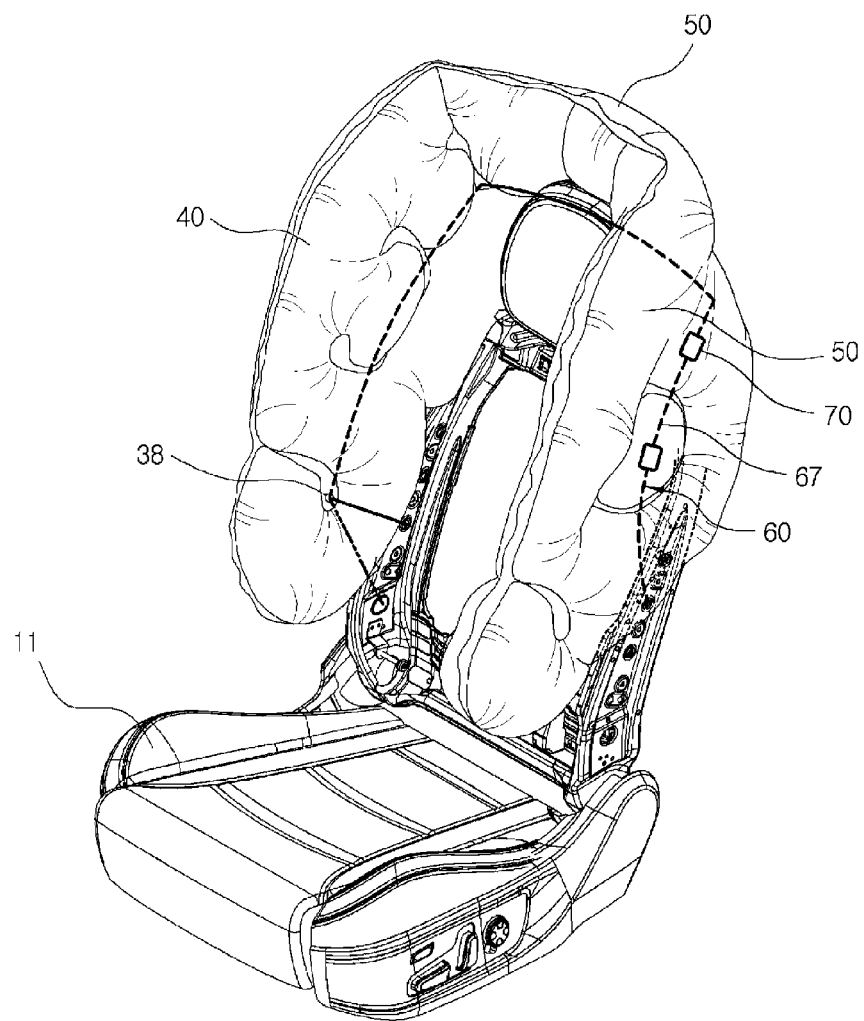

[FIG. 21]
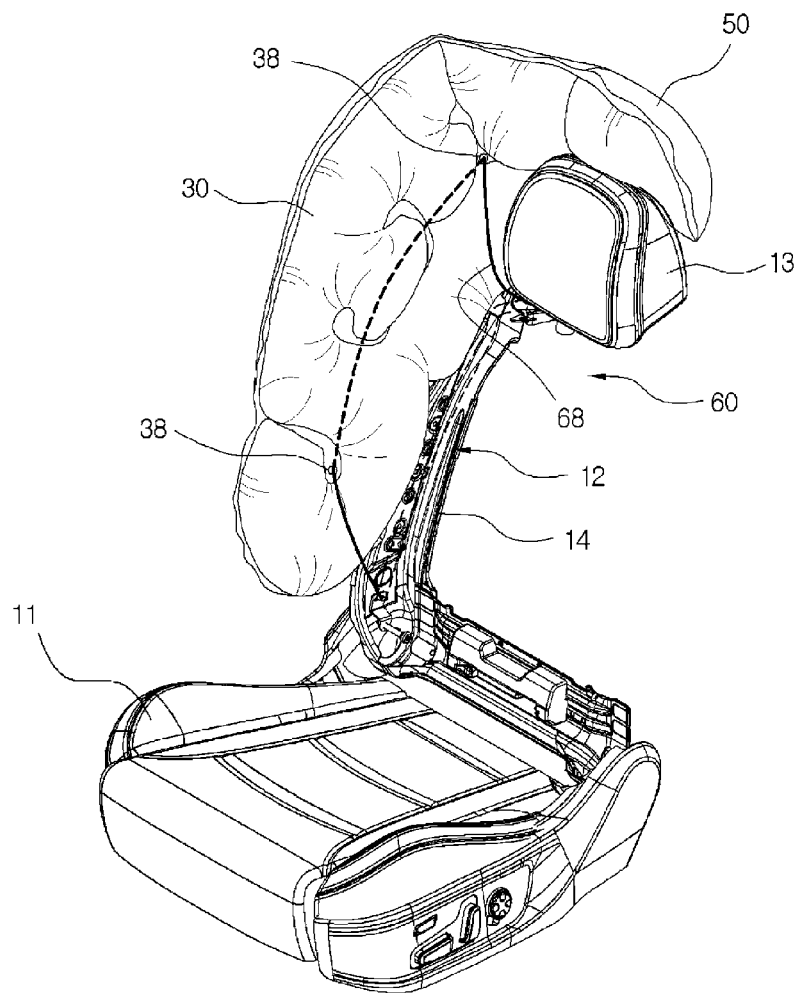

[FIG. 22]
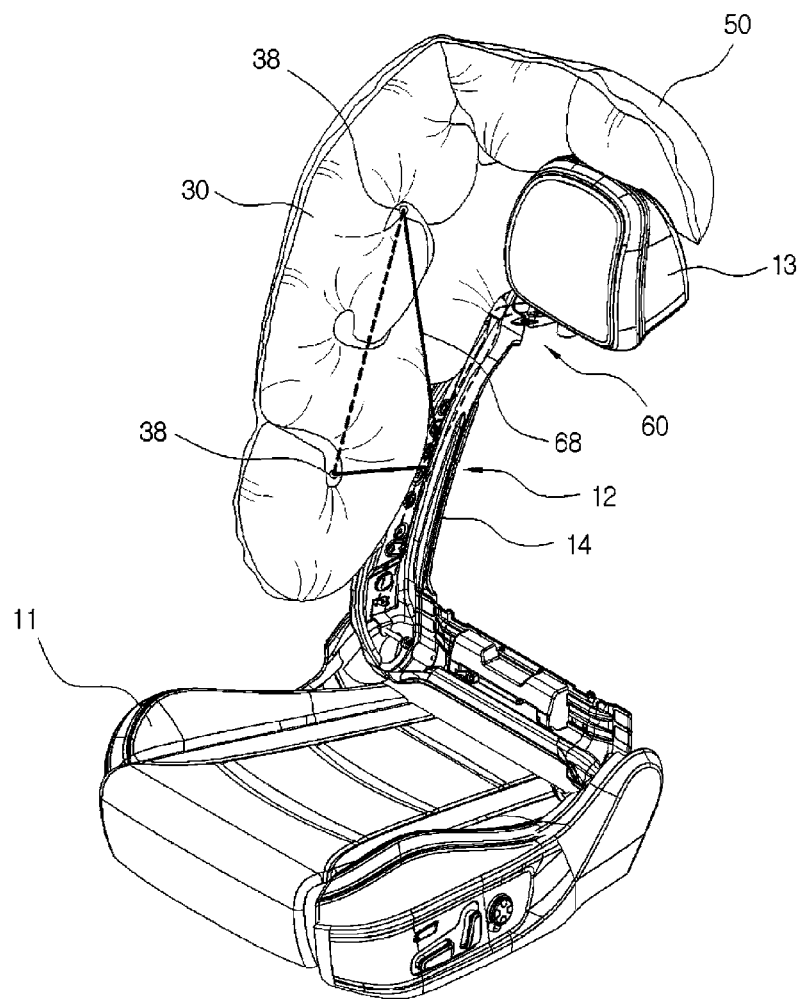

[FIG. 23]
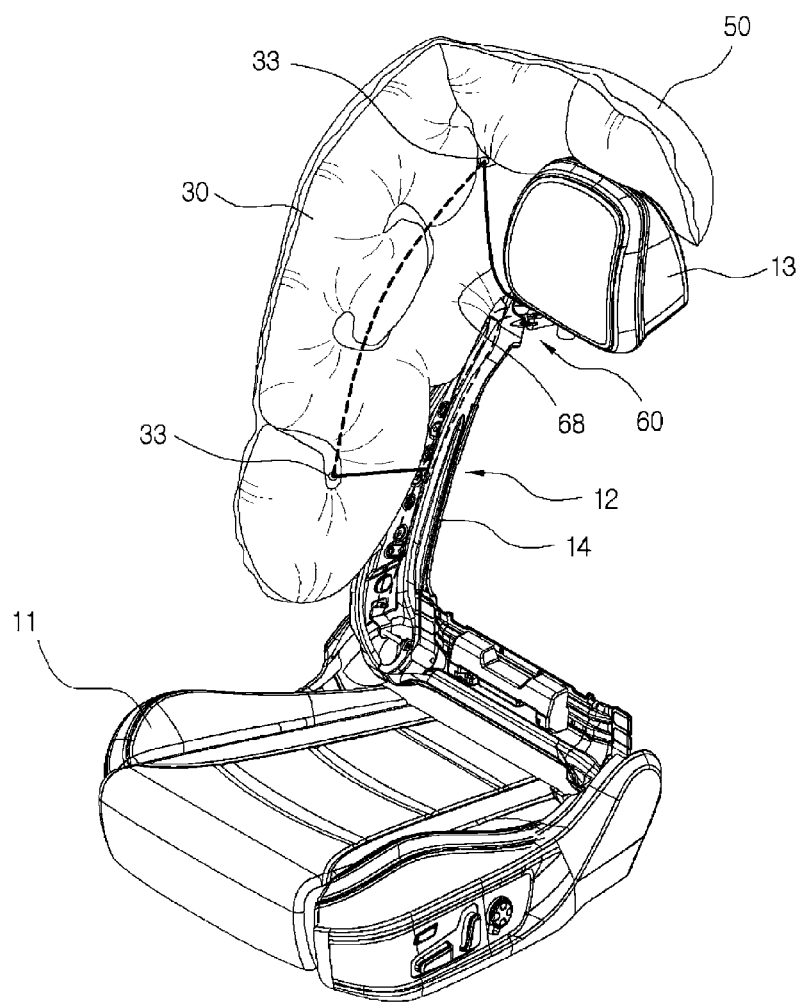

[FIG. 24]
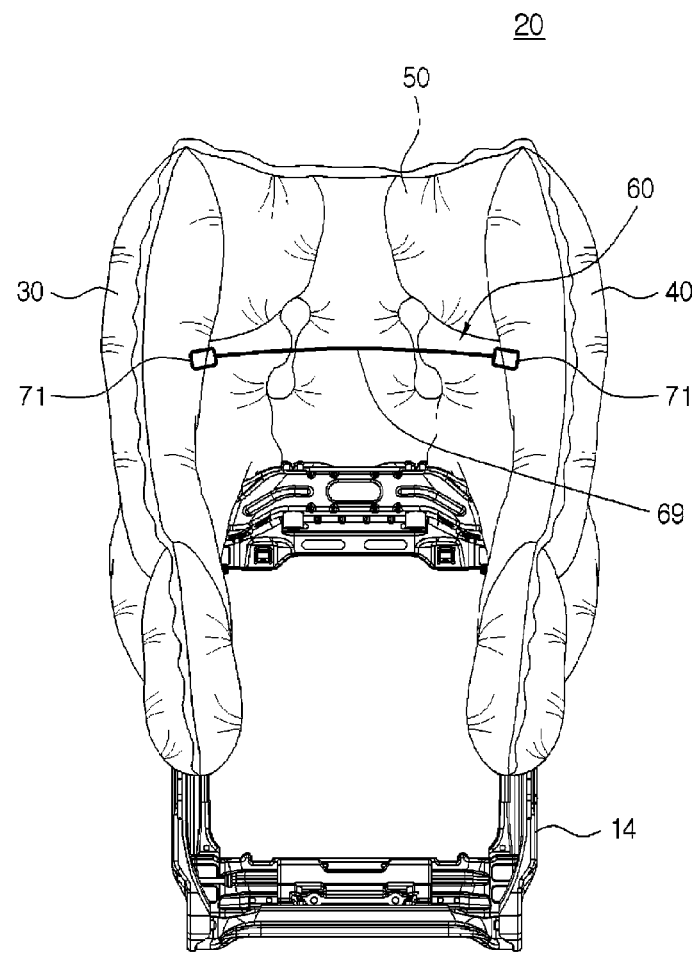

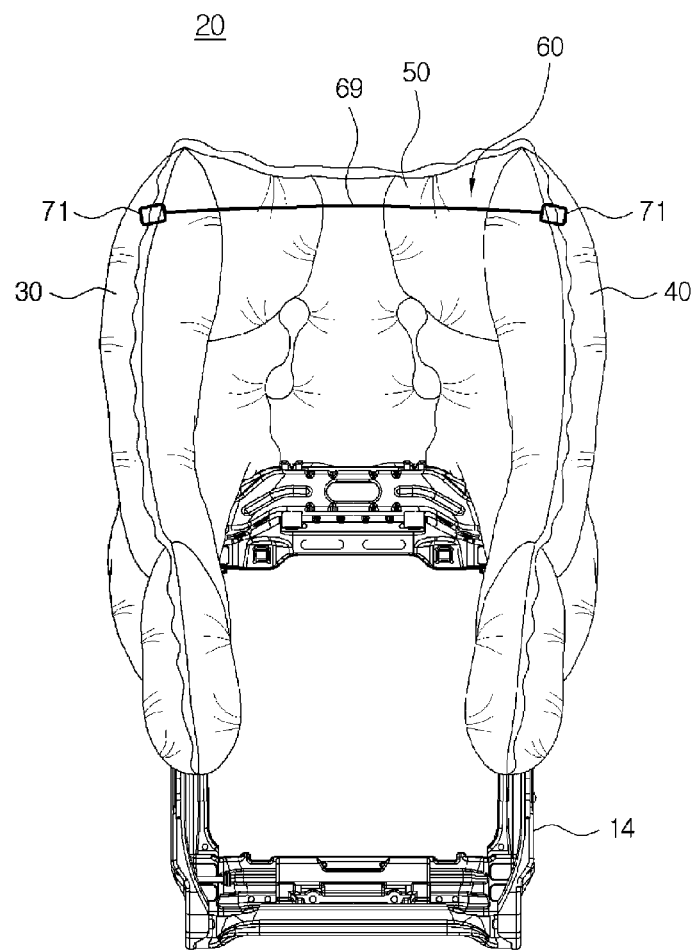
[FIG. 25]

[FIG. 26]
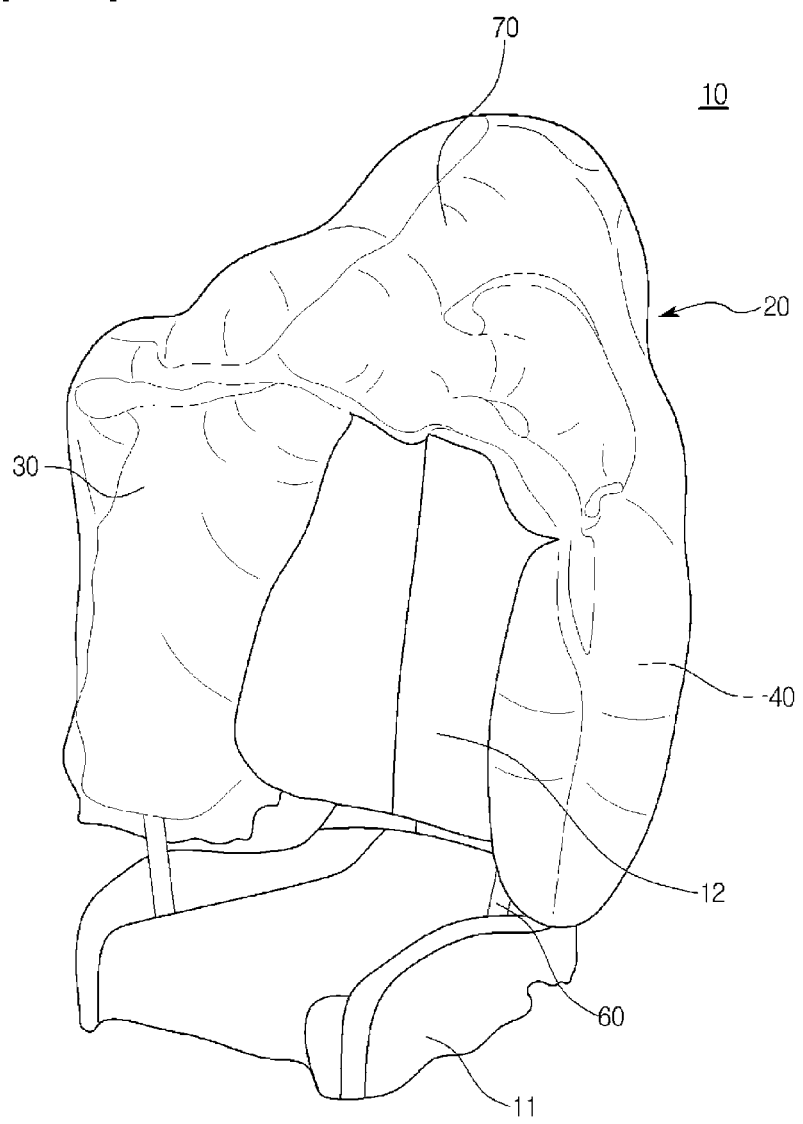

[FIG. 27]
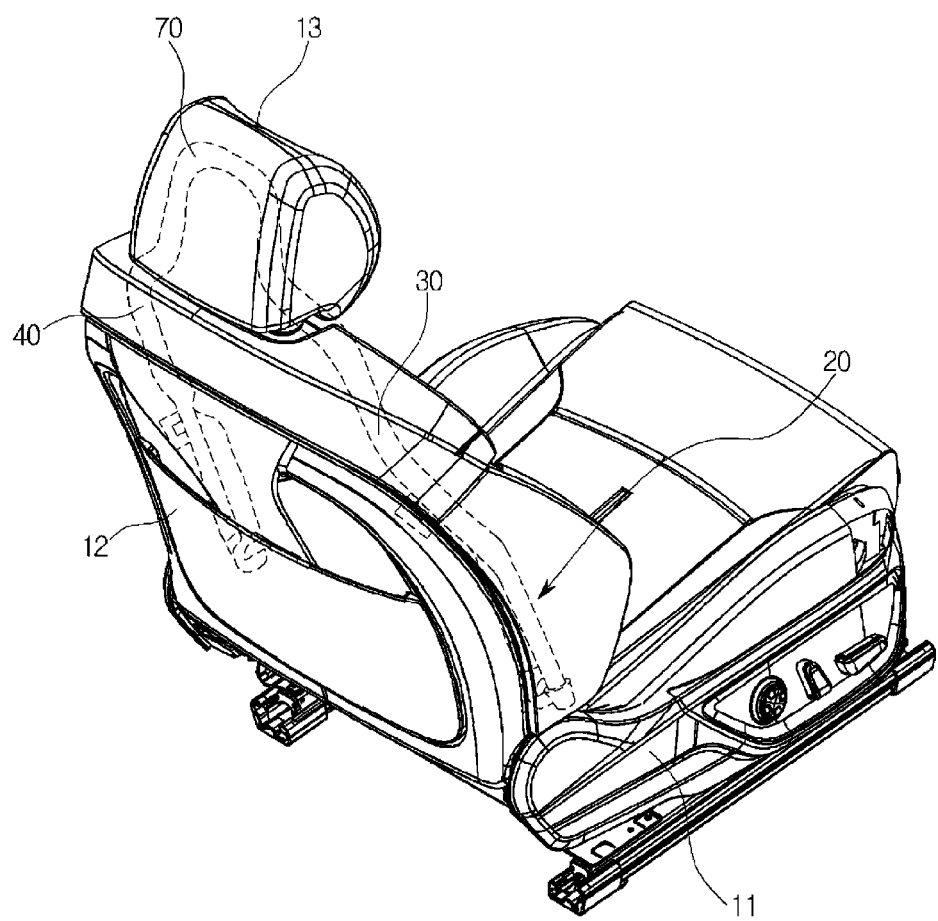

VEHICULAR AIRBAG DEVICE

TECHNICAL FIELD

The present invention relates to a vehicular airbag device, and more particularly, to a vehicular airbag device capable of safely protecting an occupant by restricting an upper body around both shoulders of the occupant in the event of a vehicle collision.

BACKGROUND ART

In general, a vehicular airbag device is a safety device for protecting an occupant by injecting gas into an airbag according to a signal of an impact sensor in the event of a vehicle collision to rapidly inflate the airbag.

The airbag device is installed on a steering wheel or dashboard, seats, side walls, etc. provide in the vehicle, and inflated toward a front surface or a side surface of the occupant to protect the occupant in the event of the vehicle collision.

That is, the vehicle may be provided with a front airbag deployed in front of a driver's seat and a passenger's seat, a curtain airbag and a side airbag deployed from the side of the occupant to protect the occupant, a knee airbag for protecting the occupant's knees, etc.

On the other hand, in recent years, an autonomous vehicle has been developed to move itself even if the driver does not drive the vehicle.

The autonomous vehicle detects each device provided in a vehicle and situations around the vehicle by using advanced sensors capable of recognizing surrounding objects and high-performance graphics processing devices, and drives by controlling the driving of each device provided in the vehicle depending on the detecting result.

The advanced sensor measures a distance between objects like people and detects a risk to help to see all regions without blind spots. In addition, the graphics processing device helps to identify a surrounding environment of the vehicle through a plurality of cameras and analyze the image so that the vehicle can drive safely.

For example, the autonomous vehicle may be mounted with LiDAR equipment, sound wave equipment, 3D cameras, radar equipment, etc.

In the autonomous vehicle configured as such, since the driver needs not to drive, the entire seat, including the driver's seat, rotates freely, and the angle of a backrest is adjusted to a horizontal state by a tilting operation.

The occupant may adjust the angle of the backrest variously, and may rotate the seat to have a meeting while facing the occupants on a rear seat.

Therefore, in the autonomous vehicle, it is impossible to apply a general airbag device designed based on a posture in which the occupant sits on the seat forward.

In the following Patent Documents 1 and 2, there is disclosed a configuration of a passenger protection system for a vehicle.

Meanwhile, since an occupant in the autonomous vehicle does not directly drive, during the movement to a destination, the occupant may have a meeting by swiveling the seat in a left and right direction or take a rest by reclining the backrest backward.

However, in Patent Documents 1 and 2, as a configuration of controlling each airbag applied to a general vehicle to be selectively deployed, there was a limitation to prevent the injury of the occupant without sufficiently reducing an impact to be applied to the occupant according to the posture or direction of the occupant in the event of a vehicle collision.

As such, in the autonomous vehicle, since the seat and backrest can be freely rotated in longitudinal and horizontal directions, the direction and posture of the occupant may be changed in various ways.

In addition, in the event of the vehicle collision, objects or damaged parts equipped inside the vehicle may cause the injury to the occupant while flying.

Accordingly, it has been required to develop a technology capable of safely protecting the occupant regardless of the sitting posture and direction of the occupant in the autonomous vehicle.

Particularly, recently, a belt integrated seat (BIS) integrated to the seat of the vehicle has been applied.

Accordingly, it has been required to develop a technology capable of safely protecting the occupant by being inflated and deployed on a front surface, a near side, and a far side of the occupant by interlocking with the BIS or a general seat belt.

PRIOR ARTS (Patent Document 1) Korean Patent Registration No. 10-1655569 (issued on Sep. 8, 2016)

(Patent Document 2) Korean Patent Registration No. 10-1611087 (issued on Apr. 11, 2016)

DISCLOSURE

Technical Problem

In order to solve the problems described above, an object of the present invention is to provide a vehicular airbag device capable of safely protecting an occupant by inflating and deploying an airbag on a front surface and both side surfaces of the occupant in the event of a vehicle collision.

Another object of the present invention is to provide a vehicular airbag device capable of safely protecting an occupant regardless of the direction and posture of an occupant in an autonomous vehicle.

Yet another object of the present invention is to provide a vehicular airbag device capable of safely protecting an occupant by improving a lateral strength at the time of deployment of an airbag cushion.

Technical Solution

In order to achieve the objects described above, there is provided a vehicular airbag device comprising: an airbag cushion which is deployed toward both side surfaces and a front surface of an occupant so as to surround and restrict the entire upper body around both shoulders of the occupant in the event of a vehicle collision, an inflator which generates gas by an impact sensing signal in the event of the vehicle collision to supply the gas to the airbag cushion, and a limiting means which limits a deployment shape of the airbag cushion.

In addition, in order to achieve the objects described above, there is provided a vehicular airbag device comprising: an airbag cushion which is deployed toward both side surfaces of an occupant so as to surround and restrict the entire upper body and the abdominal and pelvic regions around both shoulders of the occupant in the event of a vehicle collision, and a limiting means which is installed in first and second cushions of the airbag cushion to be deployed at both sides of the occupant and provides a supporting force and limits a deployment shape at the time of the deployment of the first and second cushions.

Advantageous Effects

As described above, according to the vehicular airbag device of the present invention, it is possible to improve the deployment performance of the airbag cushion by limiting the deployment shape of the airbag cushion using the limiting means and to safely protect an occupant by improving the strength of supporting a side surface of the occupant.

That is, according to the present invention, it is possible to improve a lateral strength of the first and second cushions and improve the deployment performance of the airbag cushion by limiting the deployment shape of the first and second cushions inflated and deployed at both sides of the occupant using a pair of tethers and firmly supporting the first and second cushions.

In addition, according to the present invention, it is possible to more efficiently limit the entire deployment shape of the airbag cushion as well as the front ends of the first and second cushions using the limiting member.

Therefore, according to the present invention, it is possible to safely protect the occupant by improving the lateral strength of the airbag cushion in the event of the vehicle collision and efficiently restricting both side surfaces and the front surface of the occupant.

Further, according to the present invention, it is possible to safely protect the lower body of the occupant by efficiently restricting the pelvic or thigh region of the occupant by using the limiting means for limiting the deployment shape of the airbag cushion.

DESCRIPTION OF DRAWINGS

FIG. 1 is a perspective view of a vehicular airbag device according to a preferred embodiment of the present invention, FIG. 2 is a plan view of the vehicular airbag device illustrated in FIG. 1, FIG. 3 is a development view of an airbag cushion, FIG. 4 is a front view of a vehicular airbag device according to another embodiment of the present invention, FIG. 5 is a view illustrating a deployment test result of an airbag cushion, FIGS. 6 and 7 are a front view and a side view of an airbag cushion and a limiting means which are applied to a vehicular airbag device according to a first embodiment of the present invention, FIGS. 8 and 9 are a front view and a side view of an airbag cushion and a limiting means which are applied to a vehicular airbag device according to a second embodiment of the present invention, FIGS. 10 and 11 are a front view and a side view of an airbag cushion and a limiting means which are applied to a vehicular airbag device according to a third embodiment of the present invention, FIGS. 12 and 13 are a front view and a side view of an airbag cushion and a limiting means which are applied to a vehicular airbag device according to a fourth embodiment of the present invention, FIGS. 14 and 15 are a front view and a side view of an airbag cushion and a limiting means which are applied to a vehicular airbag device according to a fifth embodiment of the present invention, FIG. 16 is a block diagram of an airbag cushion and a tether which are applied to a vehicular airbag device according to a sixth embodiment of the present invention, FIG. 17 is an operational state view of a connection member illustrated in FIG. 16, FIGS. 18 to 20 are block diagrams of an airbag cushion and a tether which are applied to a vehicular airbag device according to a seventh embodiment of the present invention, FIGS. 21 to 23 are block diagrams of an airbag cushion and a tether which are applied to a vehicular airbag device according to an eighth embodiment of the present invention, FIGS. 24 and 25 are block diagrams of an airbag cushion and a tether which are applied to a vehicular airbag device according to a ninth embodiment of the present invention, FIG. 26 is a perspective view of a vehicular airbag device according to yet another embodiment of the present invention, and FIG. 27 is a diagram illustrating a state in which the airbag cushion illustrated in FIG. 26 is installed on a seat.

MODES FOR THE INVENTION

Hereinafter, a vehicular airbag device according to a preferred embodiment of the present invention will be described in detail with reference to the accompanying drawings.

The present invention safely protect an occupant by inflating and deploying an airbag cushion on both side surfaces and a front surface of the head region and the chest region of an occupant around both shoulders of the occupant to restrict the entire upper body of the occupant.

Of course, the present invention may also protect the pelvic and thigh regions of the occupant by extending the length of the airbag cushion downward.

In addition, the present invention improves the deployment performance of the airbag by installing a tether on the airbag cushion and deploying the airbag cushion in a predetermined shape.

That is, the present invention may efficiently restrict the occupant by installing a tether inside or outside the airbag cushion to limit the deployment shape of the airbag cushion and to improve the lateral strength.

Hereinafter, a configuration of an airbag device applied to a seat (BIS) in which an integrated seat belt is installed will be described separately from a configuration of an airbag device applied to a seat in which a general seat belt is installed.

In addition, a configuration of an airbag device installed in a driver's seat of a general vehicle will be described, wherein a direction facing a front surface of the vehicle based on the driver's seat is referred to as a 'front side F' and a direction facing a back surface of the vehicle is referred to as a 'back side B'. In addition, terms for indicating a direction, such as 'left L', 'right R', 'upper U' and 'down D' are defined as indicating each direction based on the front side and the back side. In addition, a reference numeral I illustrated in the drawings represents an internal direction of the vehicle in a width direction of the vehicle, and a reference numeral O represents an outer direction of the vehicle in the width direction of the vehicle.

Therefore, a front and back (F and B) direction of the vehicle may be expressed as a horizontal direction, and an up and down (U and D) direction of the vehicle may be expressed as a longitudinal direction.

First, a configuration of a vehicular airbag device according to a preferred embodiment of the present invention will be described in detail with reference to FIGS. 1 to 3.

FIG. 1 is a perspective view of a vehicular airbag device according to a preferred embodiment of the present invention, FIG. 2 is a plan view of the vehicular airbag device illustrated in FIG. 1, and FIG. 3 is a deployment view of an airbag cushion.

As illustrated in FIGS. 1 to 3, a vehicular airbag device 10 according to a preferred embodiment of the present invention includes an airbag cushion 20 which is deployed toward both side surfaces and a front surface of an occupant so as to surround and restrict the entire upper body around both shoulders of the occupant in the event of a vehicle collision, and an inflator 21 which generates gas by an impact sensing signal in the event of the vehicle collision to supply the gas to the airbag cushion.

In addition, the vehicular airbag device 10 according to the preferred embodiment of the present invention further includes a limiting means 60 which is limited as the deployment shape of the airbag cushion 20.

The airbag cushion 20 is inflated and deployed at both side surfaces and the front surface of the occupant and serves to protect safely the occupant by restricting the head region and the chest, abdominal and pelvic regions around the shoulder regions of the occupant.

To this end, the airbag cushion 20 is formed in a shawl shape to surround both shoulders of the occupant and may be inflated and deployed toward front, upper, and lower sides of the occupant so as to correspond to the head region and the chest, abdominal and pelvic regions of the occupant around the shoulders of the occupant.

In detail, the airbag cushion 20 is installed on a backrest 12 of a seat 11 on which the occupant sits, and may include first and second cushions 30 and 40 inflated and deployed forward, upward, and downward at an upper part of both sides of the backrest 12.

The first cushion 30 may be inflated and deployed toward a right side surface and a part of the front surface of the head region and the chest and abdominal regions of the occupant while surrounding the right shoulder of the occupant, as shown in FIGS. 1 and 2.

The second cushion 40 may be inflated and deployed toward a left side surface and a part of the front surface of the head region and the chest and abdominal regions of the occupant while surrounding and restricting the left shoulder of the occupant.

That is, the first and second cushions 30 and 40 are inflated and deployed toward the front side from the upper portion of backrest 12 respectively to restrict both shoulders of the occupant and may be inflated and deployed toward the both side surfaces and the front surface of the chest, abdominal and pelvic regions from the head region of the occupant to protect the entire upper body of the occupant.

To this end, the first and second cushions 30 and 40 may be obliquely inflated and deployed toward the center of the front surface of the occupant from both side ends of the backrest 12.

Accordingly, the present invention may obtain functions of a curtain airbag, far-side and near-side airbags, and a front airbag by inflating and deploying the airbag cushion at the same time.

The upper ends of the first and second cushions 30 and 40 may be connected to each other by a connection part 50 disposed on a rear surface of a headrest 13 installed on the upper end of the backrest 12.

As such, the present invention may improve the strength of the airbag cushion by using a supporting force of the headrest, as the airbag cushion is configured as a shawl type by disposing the connection part at the rear side of the headrest.

The first and second cushions 30 and 40 may have a bag form that limits an inflatable space therein by a lower wall 301, a front wall 302, and a rear wall 303, respectively.

In addition, as illustrated in FIG. 2, the first and second cushions 30 and 40 may be formed in a bag shape by a sewing or one-piece woven method of inner panels 31 and 41 in contact with the occupant and outer panels 32 and 42 facing the outside of the occupant, respectively, and may have a plurality of protective areas so as to correspond to a body region in contact with the occupant.

For example, as illustrated in FIGS. 1 and 3, the first cushion 30 and the second cushion 40 may have upper protective areas A1 and A3 protecting the head and shoulder regions and an upper part of the chest of the occupant and lower protective areas A2 and A4 protecting a lower part of the chest and the abdominal and pelvic regions of the occupant, respectively.

In detail, the upper and lower protective areas A1 and A2 of the first cushion 30 may include first and second chambers 33 and 34 limited by a first chamber wall 35 formed along a vertical direction in a central part of the first cushion 30.

Similarly, the upper and lower protective areas A3 and A4 of the second cushion 40 may include third and fourth chambers 43 and 44 limited by a second chamber wall 45 formed along a vertical direction in a central part of the second cushion 40.

The first and second chamber walls 35 and 45 may be formed in an approximately 'C' shape opened toward the rear side, respectively.

Here, in order to efficiently absorb the impact when colliding with the head and shoulder regions of the occupant, the first and second chamber walls 35 and 45 may be formed to be inclined toward the front side from the lower portion to the upper portion so as to be located in front of the central parts of the first and second cushions 20.

In addition, the first and second chamber walls 35 and 45 may be formed to be curved in a concave shape in which the central part faces the rear side so as to restrict the shoulder and chest regions of the occupant.

Accordingly, the head and shoulder regions of the occupant may be safely protected by the second and fourth chambers 34 and 44 inflated greater than the inflation thickness of the first and third chambers 33 and 43 by the first and second chamber walls 35 and 45 in the event of a side collision of the vehicle.

In addition, the head and shoulder regions of the occupant are restricted between the first and second chambers 33 and 34 and the third and fourth chambers 43 and 44 inflated around the first and second chamber walls 35 and 45 in the event of an inclined collision of the vehicle.

As such, according to the present invention, it is possible to minimize the brain injury of the occupant by efficiently restricting the head and shoulder regions of the occupant in the event of the side collision and the inclined collision of the vehicle.

Meanwhile, a length extending downward may be variously changed and set, so that the first to fourth chambers 33, 34, 43, and 44 may protect the hip and thigh regions of the occupant as well as the abdominal and pelvic regions of the occupant respectively.

The connection part 50 may be formed with at least one third chamber wall 51 for limiting the connection part 50 to a plurality of chambers.

For example, the third chamber wall 41 may be formed along a horizontal direction to limit the connection part 50 to two chambers that are inflated and deployed in parallel vertically.

As illustrated in FIG. 2, the first cushion 30, the connection part 50 and the second cushion 40 may be inflated and deployed to be curved in an approximately '∩' shape when viewed from the front surface by the first to third chamber walls 35, 45, and 51 in the event of the vehicle collision.

Accordingly, the connection part 50 may restrict the head region of the occupant so as not to move outside the headrest and absorb the impact due to the collision in the event of the inclined collision of the vehicle, thereby efficiently reducing the brain injury of the occupant.

Here, each wall of the first and second cushions 30 and 40 and the chamber walls may be formed in a sewing or one-piece woven weaving method the inner and outer panels 31, 32, 41, and 42 of the first and second cushions 30 and 40, respectively.

Alternatively, each wall of the first and second cushions 30 and 40 and the chamber walls may be formed by selectively applying at least one appropriate method of various bonding methods such as adhesives, RF welding, ultrasonic welding, etc.

In addition, in the present embodiment, first and second introduction parts 36 and 46 introduced gas from each inflator 21 may be provided on the rear walls 303 and 403 of the first and second cushions 30 and 40, respectively.

The first and second introduction parts 36 and 46 are connected with each inflator 21.

For example, the first and second introduction parts 36 and 46 may be formed to be inclined upward to the front side from the rear side of the second and fourth chambers 34 and 44, so as to preferentially transmit the gas supplied from the inflator 21 to the second chamber 34 and the fourth chamber 44 in the event of the vehicle collision.

As illustrated in FIG. 3, two inflators 21 may be provided to have the same standard each other, such as a gas generation amount, a supply speed, etc., or have different standards according to a collision characteristic of a far side and a near side of the occupant.

Of course, the present invention is not limited thereto, and may also be changed to supply the gas to the airbag cushion using one inflator or supply the gas to the airbag cushion using three or more inflators.

Alternatively, the introduction part introduced with the gas from the inflator 21 may also be provided in the connection part 50.

That is, the introduction part is connected with the inflator 21 and the gas supplied from the inflator 21 is transmitted to the first cushion 30 and the second cushion 40 through the connection part 50 in the event of the vehicle collision.

Accordingly, the first and second cushions 30 and 40 are continuously inflated and deployed by receiving the gas through the connection part 50 in the event of the vehicle collision.

In addition, the inflator 21 may have a predetermined standard, such as a gas generation amount, a supply speed, etc., according to a collision characteristic in each direction, such as the far side and the near side, the front surface, etc. of the occupant.

The present invention may also be changed to efficiently supply the gas to the airbag cushion 20 by providing the introduction parts on both sides of the upper end of the connection part 50 or providing one or more introduction parts at different positions and applying one or more inflators 21.

As such, a configuration of the airbag cushion will be described in detail with reference to FIGS. 1 to 3, but the present invention is not necessarily limited thereto.

The first and second cushions 30 and 40 and the rear walls 303 and 403 of the connection part 50 configured as such may be fixed into the backrest 12 of the seat 11 by using a plurality of fixing members (not illustrated).

Further, the configuration of the airbag cushion has been described in detail with reference to FIGS. 1 to 3, but the present invention is not necessarily limited thereto. The number, the shape, the length, the size, etc. of the chambers and the chamber walls provided in the airbag cushion may be variously changed so as to deploy the airbag cushion in various shapes and sizes according to conditions for protecting the occupant.

In addition, FIG. 4 is a front view of a vehicular airbag device according to another embodiment of the present invention.

As illustrated in FIG. 4, in a driver's seat 11 of the vehicle to which a general seat belt 15 is applied, both ends of the seat belt 16 are provided at an upper part and a lower part of a center filler 16 (called a 'B filler') and a buckle 17 combined with a tongue of the seat belt 15 is installed at a lower right portion of the driver's seat 11.

As a result, when the airbag cushion 20 above described is applied to the vehicle applied with the general seat belt, the seat belt 15 and the second cushion 40 may interfere with each other.

Accordingly, the present invention may be configured to include a part of the second cushion 40, that is, only the upper protective area A3 of the second cushion 40 illustrated in FIG. 3 when the general seat belt is applied.

In addition, a near-side airbag 18 may be installed at a left side end of the backrest 12.

As such, according to the present invention, it is possible to protect the left side surface of the occupant by applying partially the second cushion and interlocking with the previously installed near-side airbag to avoid the interference with the seat belt.

As described above, in the present invention, the airbag cushion 20 is inflated and deployed in a shawl shape surrounding the entire upper body around both shoulders of the occupant in the event of the vehicle collision and serves to protect safely the occupant by restricting both side surfaces and the front surface of the occupant.

FIG. 5 is a view illustrating a deployment test result of the airbag cushion.

As a result of the deployment test of the airbag device 10 to which the limiting means 60 is not applied, as illustrated in FIG. 5, there was a problem that while the first and second cushions 30 and 40 are divided into both sides, the airbag cushion 20 is not deployed in an optimal deployment shape of restricting both side surfaces and the front surface of the occupant.

Accordingly, the present invention applies the limiting means 60 which limits the deployment shape so that the airbag cushion 20 is deployed in an optimal deployment shape of restricting both side surfaces and the front surface of the occupant.

A configuration of the limiting means 60 will be described in detail with reference to FIGS. 6 to 13.

Example 1

FIGS. 6 and 7 are a front view and a side view of an airbag cushion and a limiting means which are applied to a vehicular airbag device according to a first embodiment of the present invention.

In the present embodiment, a limiting means 60 may be provided with a first tether 61 having both ends which are connected to the seat 11 and the airbag cushion 20.

For example, as illustrated in FIGS. 6 and 7, the first tether 61 may be provided with a pair installed between both side surfaces of the seat 11 and the front parts of the first and second cushions 30 and 40.

Such a first tether 61 may be prepared by using the same or similar fabric material as or to the airbag cushion 20.

One end of the first tether 61 is fixed to the first and second cushions 30 and 40 in a sewing method, and one end of the first tether 61 may be fixed to a frame (not illustrated) in the seat 11.

In the event of the vehicle collision, while the airbag cushion 20 is inflated and deployed, the first tether 61 may protrude outside the seat 11 while cutting a tear line (not illustrated) formed on a side surface or an upper surface of a cover of the seat 11.

Meanwhile, in FIGS. 6 and 7, it is illustrated that a lower end of the first tether 61 is connected to both side edges of the seat 11, but the lower end of the first tether 61 may be fixed to the frame through various positions such as a side surface, an upper surface or a lower surface, or the like of the seat 11.

However, as the deployment performance test results of the airbag cushion 20, it can be seen that as the lower end of the first tether 61 is installed closer to the front part of the seat 11, the deployment shape of the airbag cushion 20 is efficiently limited.

Accordingly, it is preferred that the lower end of the first tether 61 is installed close to the front part of the seat 11.

In addition, it is preferred that the upper end of the first tether 61 is connected to the lower walls 301 and 401 or the front walls 302 and 402 of the airbag cushion 20 to be prevented from being separated by an inflating force.

As such, as the first tether 61 is installed between the seat 11 and the airbag cushion 20, the first and second cushions 30 and 40 of the airbag cushion 20 are inflated and deployed while maintaining intervals corresponding to the lengths the seat 11 and the first tether 61 in the event of the vehicle collision.

Accordingly, the airbag cushion 20 may be deployed in an optimal deployment shape of restricting the both side surfaces and the front surface of the occupant.

In addition, according to the present invention, as the deployment shape of the airbag cushion is limited by using the first tether, it is possible to improve the deployment performance of the airbag cushion and safely protect the occupant by improving the strength of supporting the side surface of the occupant.

Example 2

FIGS. 8 and 9 are a front view and a side view of an airbag cushion and a limiting means which are applied to a vehicular airbag device according to a second embodiment of the present invention.

In the second embodiment of the present invention, a limiting means 60 may include a pair of second tethers 62 installed between non-inflating areas 37 and 47 inactivated so as not to be inflated by the first and second chamber walls 35 and 45 in the first and second cushions 30 and 40 and the seat 11.

For example, an upper end of each second tether 62 is fixed to inner surfaces or outer surfaces of the non-inflating areas 37 and 47 in a sewing method and a lower end of the second tether 62 may be fixed to a frame in the seat 11.

That is, as the upper end of the second tether 62 is connected to the non-inflating areas 37 and 47 by the first and second chamber walls 35 and 45, according to the present invention, while the airbag cushion 20 is inflated and deployed, it is possible to prevent the first and second cushions 30 and 40 and the second tether 62 from being separated or the damage or breakage to the first and second cushions 30 and 40.

As such, according to the present invention, as the deployment shape of the airbag cushion is limited by using the second tether, it is possible to improve the deployment performance of the airbag cushion and safely protect the occupant by improving the strength of supporting the side surface of the occupant.

Example 3

FIGS. 10 and 11 are a front view and a side view of an airbag cushion and a limiting means which are applied to a vehicular airbag device according to a third embodiment of the present invention.

In the third embodiment of the present invention, as illustrated in FIGS. 10 and 11, a limiting means 60 may include a pair of third tethers 63 which are installed outside the first and second cushions 30 and 40 and then fixed to the seat 11 through the first and second cushions 30 and 40.

That is, as an upper end of the third tether 63 is connected to the front parts, that is, the front walls 302 and 402 of the first and second cushions 30 and 40 and disposed on the outer surfaces of the first and second cushions 30 and 40, the third tether 63 limits the deployment shape of the airbag cushion 20 so as to prevent the first and second cushions 30 and 40 from being divided to the outside.

In addition, a lower end of the third tether 63 is connected to the seat 11 inside the first and second cushions 30 and 40 through the first and second cushions 30 and 40.

To this end, in the first and second cushions 30 and 40, through-holes 38 and 48 through which the third tether 63 penetrates toward the inside from the outside may be formed.

The through-holes 38 and 48 may be formed in an area requiring a relatively high lateral strength on the first and second chamber walls 35 and 45, i.e., an area requiring a relatively low lateral strength by avoiding the shoulder region and the pelvic region of the occupant, i.e., an intermediate position corresponding to the side between the shoulder and the pelvis of the occupant.

As such, according to the present invention, as the pair of third tethers is installed on the outer surfaces of the first and second cushions and then fixed to the seat through the first and second cushions, it is possible to improve a lateral strength of the first and second cushions and improve the deployment performance of the airbag cushion by limiting the deployment shape of the airbag cushion.

Particularly, according to the present invention, it is possible to more efficiently limit the deployment shape of the first and second cushions by installing the pair of third tether in a position higher than the center of the front ends of the first and second cushions.

Example 4

FIGS. 12 and 13 are a front view and a side view of an airbag cushion and a limiting means which are applied to a vehicular airbag device according to a fourth embodiment of the present invention.

In the fourth embodiment of the present invention, as illustrated in FIGS. 12 and 13, a limiting means 60 may include a limiting member 64 which is disposed along the outer surface of the airbag cushion 20 and limits the deployment shape so that the first and second cushions 30 and 40 are not divided into both sides.

That is, both ends of the limiting member 64 are fixed to the seat 11 and disposed along the outer surfaces of the first and second cushions 30 and 40 and the connection part 50 to limit the deployment shape of the airbag cushion 20.

Such a limiting member 64 is provided with a fabric made to have the strength in a weaving process, such as a crepe and may be prepared so that a portion disposed in the connection part 50 has a larger width than that of a portion disposed on the outer surfaces of the first and second cushions 30 and 40.

Here, a central part of the limiting member 64 may be fixed to the outer surface of the connection part 50 in a sewing method so as to prevent the moving of the limiting member 64 at the time of the deployment of the airbag cushion 20 and fix the position of the limiting member 64.

Accordingly, according to the present invention, since the limiting member is disposed on the outer surface of the airbag cushion and the both ends of the limiting member are fixed to the seat, it is possible to improve the deployment performance of the airbag cushion by limiting the deployment shape so that the airbag cushion is not divided into both sides and improving the lateral strength of the first and second cushions.

Example 5

FIGS. 14 and 15 are a front view and a side view of an airbag cushion and a limiting means which are applied to a vehicular airbag device according to a fifth embodiment of the present invention.

In the fifth embodiment of the present invention, as illustrated in FIGS. 14 and 15, a limiting means 60 may include a fourth tether 65 which is alternately disposed on the outer surface and the inner surface of the airbag cushion 20 and limits the deployment shape so that the first and second cushions 30 and 40 are not divided into both sides.

That is, both ends of the fourth tether 65 are fixed to the seat 11, a central part of the fourth tether 65 is disposed on the outer surface of the connection part 50, and both side parts of the fourth tether 65 are alternately disposed along the outer surface and the inner surface of the first and second cushions 30 and 40, respectively, to limit the deployment shape of the airbag cushion 20.

To this end, a pair of through-holes 38 and 48 may be formed in a pair of non-inflating areas 37 and 47 formed in the first and second cushions 30 and 40, respectively.

Accordingly, both side parts of the fourth tether 65 are inserted into the inner sides of the first and second cushions 30 and 40 through the through-holes 38 and 48 located at the upper portion of the pair of through-holes 38 and 48, respectively, and then may be drawn out to the outer sides of the first and second cushions 30 and 40 through the through-holes 38 and 48 located at the lower portion thereof.

Here, the central part of the fourth tether 65 may be partially fixed to the connection part 50 of the airbag cushion so as to prevent the moving of the fourth tether 65 and fix the position of the fourth tether 65 at the time of the deployment of the airbag cushion 20.

For example, the fourth tether 65 and the connection part 50 may be fixed by at least one sewing line 66 in a sewing method.

Alternatively, the fourth tether 65 and the connection part 50 may be fixed by an additional tether (not illustrated) or also fixed to each other through a through-hole formed in the additional tether.

Accordingly, according to the present invention, since the fourth tether is alternately disposed on the outer surface and the inner surface of the airbag cushion and both ends of the fourth tether are fixed to the seat, it is possible to improve the deployment performance of the airbag cushion by limiting the deployment shape so that the airbag cushion is not divided into both sides and improving the lateral strength of the first and second cushions.

Meanwhile, in the embodiments, it has been described that the limiting means has the first to fourth tethers and the limiting members, respectively, but the present invention is not necessarily limited thereto.

That is, the present invention may also be changed so as to simultaneously apply two or more of the first to fourth tethers and the limiting members to the limiting means.

Example 6

FIG. 16 is a block diagram of an airbag cushion and a tether which are applied to a vehicular airbag device according to a sixth embodiment of the present invention and FIG. 17 is an operational state view of a connection member illustrated in FIG. 16.

In the present embodiment, as illustrated in FIG. 16, the deployment shape of the airbag cushion 20 may be limited by a limiting means 60 provided with one fifth tether 66 fixed to both sides of the seat 11.

Both ends of the fifth tether 66 may be fixed to both sides of a seat frame 14 provided in the seat 11.

In addition, one side part of the fifth tether 66, a left side part when viewed in FIG. 16 is disposed upward along the front surface of the second cushion 40, disposed horizontally backward along the outer surface of the upper part of the second cushion 40, inserted into the airbag cushion 20 through the left upper part of the second cushion 40 or the left side end of the connection part 50 and disposed horizontally along the inter surface of the connection part 50.

To this end, a through-hole 48 may be formed at the upper end of the second cushion 40 or the left side end of the connection part 50 so that the fifth tether 66 is inserted into the airbag cushion 20.

Subsequently, the fifth tether 66 is drawn out to the outside of the airbag cushion 20 through the upper end of the first cushion 30 or the other side end of the connection part 50, that is, a right side end in FIG. 4 and may be disposed horizontally forward along the outer surface of the upper part of the first cushion 30.

To this end, a through-hole 38 may be formed at the upper end of the first cushion 30 or the right side end of the connection part 50 so that the fifth tether 66 can be drawn out to the outside of the airbag cushion 20.

In addition, the fifth tether 66 is disposed downward along the front surface of the first cushion 30.

Here, a fixing member 70 fixing the fifth tether 66 may be installed on the front surfaces of the first cushion 30 and the second cushion 40.

The fixing member 70 stably fixes the fifth tether 66 to the airbag cushion 20, and in order to prevent the fixing member 70 from being separated from the airbag cushion 20 when the airbag cushion 20 is inflated and deployed, a plurality of fixing members may be installed to be spaced apart from each other preset intervals on the front surfaces of the first cushion 30 and the second cushion 40.

Such a fixing member 70 is formed in an approximately quadrangular plate shape or a band shape, and may be prepared by using the same or similar fabric material as or to the airbag cushion 20, like the limiting means 60.

That is, a space in which the fifth tether 66 is disposed is provided in the fixing member 70, and both ends of the fixing member 70 may be fixed to the first cushion 30 or the second cushion 40 in a sewing method.

Meanwhile, in the present embodiment, it has been described that the position of the fifth tether 66 is fixed by using the fixing member 70, but the present invention is not necessarily limited thereto.

For example, according to the present invention, it is possible to fix the position of the first tether by various methods, such as a method of forming and fixing a plurality of sewing parts partially in the fifth tether 66 by directly sewing both ends and the central part of the fifth tether 66 to the first cushion 30 or the second cushion 40 at regular intervals, instead of installing the fixing member 70.

Meanwhile, as illustrated in FIGS. 16 and 17, both ends of the fifth tether 66 fixed to the seat frame 14 may be connected to each other.

That is, since both ends of the fifth tether 66 are connected to each other, the fifth tether 66 may be provided in one loop shape.

Alternatively, both ends of the fifth tether 66 may be connected to each other by a separate connection part 80.

As such, when both ends of the fifth tether 66 are connected to each other, as illustrated in FIG. 17, a lower end portion of the fifth tether 66 or the connection member 80 is disposed in the seat 11 and may be drawn out to the outside through a cutting line (not illustrated) formed on a cover of the seat 11 at the time of the deployment of the airbag cushion 20.

Then, the lower end portion of the fifth tether 66 or the connection member 80 restricts both sides and the lower surface of the pelvic or thigh region of the occupant by pulling toward the center at the time of the deployment of the airbag cushion 20.

Accordingly, according to the present invention, it is possible to safely protect the lower body of the occupant by efficiently restricting the pelvic or thigh region of the occupant by using the tether for limiting the deployment shape of the airbag cushion.

Meanwhile, in the present embodiment, it has been described that the connection member 80 is connected to both ends of the fifth tether 66, but the present invention may be changed so that the connection member 80 is not connected to both ends of the fifth tether 66, but connected to the lower parts of the first and second cushions 30 and 40.

That is, according to the present invention, both ends of the connection member 80 are connected to the lower parts of the first cushion 30 and the second cushion 40 and the connection member 80 may be embedded in the seat 11 respectively.

Accordingly, according to the present invention, when the airbag cushion is inflated and deployed by the collision of the vehicle, it is possible to limit the deployment shape of the lower parts of the first and second cushions while the connection member is drawn out to the outside of the seat and restrict the pelvic or thigh region of the occupant at the same time.

Example 7

FIGS. 18 to 20 are block diagrams of an airbag cushion and a tether which are applied to a vehicular airbag device according to a seventh embodiment of the present invention.

In the present embodiment, as illustrated in FIGS. 18 to 20, the deployment shape of the airbag cushion 20 may be limited by any one of sixth to eighth tethers 67 to 69 of which both ends are coupled to both sides of a backrest frame 19 provided in the backrest 12 of the seat 11, respectively.

The backrest frame 19 may be formed in an approximately quadrangular frame in which a space is provided in a central part.

As illustrated in FIG. 6, an upper end and a lower end of the sixth tether 67 are fixed to an upper end and a lower end of both side frames of the backrest frame 19, respectively.

For example, both ends of the sixth tether 67 may be fixed to the lower parts of both side frames of the backrest frame 19 or both sides of the seat frame provided in the seat 11.

In addition, the sixth tether 67 is disposed to be inclined backward and upward along the outer surface of the second cushion 40, inserted into the airbag cushion 20 through the upper end of the second cushion 40 or one side end of the connection part 50, that is, the left side end when viewed from FIG. 6, and then may be installed horizontally along the inner surface of the connection part 50.

To this end, a through-hole 48 may be formed in the upper end of the second cushion 40 or the left side end of the connection part 50, so that the sixth tether 67 is inserted into the airbag cushion 20.

Subsequently, the sixth tether 67 is drawn out to the outside of the airbag cushion 20 through the upper end of the first cushion 30 or the other side end of the connection part 50, that is, a right side end when viewed in FIG. 6 and may be disposed to be inclined forward and downward along the outer surface of the first cushion 30.

To this end, a through-hole 38 may be formed in the upper end of the first cushion 30 or the right side end of the connection part 50, so that the sixth tether 67 can be drawn out to the outside of the airbag cushion 20.

Here, a fixing member 70 fixing the position of the sixth tether 67 may be installed on the outer surfaces of the first cushion 30 and the second cushion 40 for stable tether routing of the sixth tether 67.

The fixing member 70 stably fixes the sixth tether 67 to the outer surface of the airbag cushion 20, and in order to prevent the fixing member 70 from being separated from the airbag cushion 20 when the airbag cushion 20 is inflated and deployed, a plurality of fixing members may be installed to be spaced apart from each other by preset intervals on the outer surfaces of the first cushion 30 and the second cushion 40.

The fixing member 70 is formed in an approximately quadrangular plate shape or a band shape, and may be prepared by using the same or similar fabric material as or to the airbag cushion 20, like the limiting means 60.

Such a fixing member 70 is provided with a space in which the sixth tether 67 is disposed, and both ends of the fixing member 70 may be fixed to the first cushion 30 or the second cushion 40 in a sewing method.

Meanwhile, in the present embodiment, it has been described that the position of the tether is fixed by using the fixing member 70, but the present invention is not necessarily limited thereto.

For example, according to the present invention, it is possible to fix the position of the tether by various methods, such as a method of forming and fixing a sewing part partially in the sixth tether 67 by directly sewing the sixth tether 67 to the first cushion 30 or the second cushion 40, instead of installing the fixing member 70.

As such, according to the present invention, it is possible to firmly fix the sixth tether disposed on the outer surfaces of the first and second cushions by connecting both ends of one sixth tether to the lower part of the backrest frame or both sides of the seat frame, respectively, and using the plurality of fixing members.

Accordingly, according to the present invention, it is possible to improve the lateral strength of the first and second cushions by using the sixth tether and the fixing member.

On the other hand, in the present embodiment, it has been described that both ends of the sixth tether 67 are fixed to both sides of the seat frame provided in the lower parts of both side frames of the backrest frame 19 or the seat 11, but the present invention is not necessarily limited thereto.

That is, as illustrated in FIG. 19, both ends of the sixth tether 67 may be fixed to the lower parts or the central part of both side frames of the backrest frame 19 or an inflator stud installed in the backrest 12, respectively.

To this end, the both ends of the sixth tether 67 may be inserted into the inner surface from the outer surfaces of the first and second cushions 30 and 40 through the through-holes 38 and 48, respectively, disposed to be horizontally curved toward the rear side, and then fixed to the lower parts or the central part of both side frames of the backrest frame 19 or the inflator stud of the backrest frame 19.

As such, according to the present invention, both end parts of the second tether are horizontally curved toward the rear side along the inner surfaces of the first and second cushions to be fixed to the lower parts or the central part of both side frames of the backrest frame 19 or the inflator stud of the backrest frame 19, respectively, thereby further improving the lateral strength of the first and second cushions.

Alternatively, one end part of the sixth tether 67, the right side part when viewed in FIG. 20 is disposed to be curved toward the rear side along the inner surface of the first cushion 30, and then the right side end of the eighth tether 69 may be fixed to the lower part of the right frame or the central part of the backrest frame 19 or the inflator stud of the backrest frame 19.

In addition, the other end part of the sixth tether 67, the left side part when viewed in FIG. 8 is fixed to the inner surface of the second cushion 40 by the fixing member 70, and the left side end of the sixth tether 67 may be fixed to the inflator stud.

Of course, the present invention may also be changed so that the left side part of the sixth tether 67 is disposed to be curved toward the rear side and then fixed to the lower part of the left frame or the central part of the backrest frame 19 or the inflator stud of the backrest frame 19, and the right side part of the sixth tether 67 is fixed to the inner surface of the first cushion 30, and the right side end of the sixth tether 67 is fixed to the inflator stud.

As such, according to the present invention, one end part of the second tether is curved horizontally toward the rear side to be fixed to the lower part of both side frames or the central part of the backrest frame or the inflator stud and the other end of the second tether is fixed to the inflator stud, so as to differently give the lateral strength of the first and second cushions.

Example 8

FIGS. 21 to 23 are block diagrams of an airbag cushion and a tether which are applied to a vehicular airbag device according to an eighth embodiment of the present invention.

In the present embodiment, as illustrated in FIG. 21, the deployment shape of the airbag cushion 20 may be limited by a pair of seventh tethers 68 having both ends which are coupled to both side frames of the backrest frame 19 provided in the backrest 12, respectively.

An upper end and a lower end of the pair of seventh tethers 68 may be fixed to an upper end and a lower end of the both side frames of the backrest frame 19, respectively.

For example, the upper end and the lower end of the seventh tether 68 installed at the right side of the backrest 12 may be fixed to the right side frame of the backrest frame 19 so as to limit the deployment shape of the first cushion 30 inflated and deployed at the right side of the occupant.

In addition, while the upper end of the seventh tether 68 is fixed to the upper end of the right side frame of the backrest frame 19, the seventh tether 68 may be disposed to be inclined upward or forward and upward along the inner surface of the first cushion 30 and drawn out to the outside of the airbag cushion 20 through the upper part of the first cushion 30.

To this end, in order to draw out the seventh tether 68 to the outside of the airbag cushion 20, a through-hole 38 may be formed in a non-inflating area formed by the chamber wall at the upper part of the first cushion 30.

Then, the seventh tether 68 may be disposed downward along the outer surface of the first cushion 30 toward the lower end side from the upper end side of the first cushion 30.

In addition, the seventh tether 68 is inserted into the airbag cushion 20 through the lower part of the first cushion 30 and disposed to be inclined backward and downward along the inner surface of the first cushion 30, and the lower end of the seventh tether 68 may be fixed to the lower part of the right side frame of the backrest frame 19.

To this end, in order to insert the seventh tether 68 to the inside of the airbag cushion 20, a through-hole 38 may be formed in the lower part of the first cushion 30.

Similarly, in order to limit the deployment shape of the second cushion 40 inflated and deployed to the left side of the occupant, the seventh tether 68 installed at the left side of the backrest 12 is disposed sequentially on the inner surface and the outer surface, and then the inner surface of the second cushion 40 while the upper end is fixed to the upper part of the left side frame of the backrest frame 19, and then the lower end may be fixed to the lower part of the left side frame.

As such, according to the present invention, it is possible to limit the deployment shape of the first and second cushions by installing the pair of seventh tethers along the inner surface and the outer surface, and then the inner surface of the first and second cushions inflated and deployed at both sides of the occupant and firmly support the first and second cushions.

Accordingly, according to the present invention, it is possible to safely protect the occupant by improving the lateral strength of the airbag cushion in the event of the vehicle collision and efficiently restricting both side surfaces and the front surface of the occupant.

Meanwhile, in the present embodiment, it has been described that both ends of the seventh tether are connected to the upper end and the lower end of both side frames in the backrest, respectively, but the present invention is not necessarily limited thereto.

That is, as illustrated in FIG. 22, an upper end and a lower end of the seventh tether 68 may be fixed to middle parts of both side frames of the backrest frame 19, respectively.

Accordingly, each seventh tether 68 is disposed forward and upward along the inner surfaces of the first and second cushions 30 and 40, drawn out to the outsides of the first and second cushions 30 and 40 to be disposed downward along the outer surfaces of the first and second cushions 30 and 40, and then inserted into the first and second cushions 30 and 40 to be inclined backward or upward along the inner surfaces of the first and second cushions 30 and 40.

As such, according to the present invention, it is possible to further improve the lateral strength of the middle parts of the first and second cushions in the airbag cushion by connecting both ends of the pair of seventh tethers to the middle parts of both sides of the backrest frame.

Alternatively, as illustrated in FIG. 23, the upper end of the seventh tether 68 may be fixed to the upper end of both side frames of the backrest frame 19 and the lower end of the seventh tether 68 may be fixed to the middle part of the both side frames of the backrest frame 19.

Accordingly, each seventh tether 68 is disposed to be inclined forward and upward along the inner surfaces of the first and second cushions 30 and 40, drawn out to the outside of the first and second cushions 30 and 40 to be disposed downward along the outer surfaces of the first and second cushions 30 and 40, and then inserted into the first and second cushions 30 and 40 to be horizontally disposed approximately backward along the inner surfaces of the first and second cushions 30 and 40 or disposed to be slightly inclined backward and upward.

As such, according to the present invention, it is possible to further improve the lateral strength of the middle parts and the upper parts of the first and second cushions in the airbag cushion by connecting both ends of the pair of seventh tethers to the upper ends and the middle parts of both side frames of the backrest frame, respectively.

Example 9

FIGS. 24 and 25 are block diagrams of an airbag cushion and a tether which are applied to a vehicular airbag device according to a ninth embodiment of the present invention.

In the present embodiment, as illustrated in FIGS. 24 and 25, the deployment shape of the airbag cushion 20 may be limited by the eighth tether 69 of which both ends are fixed to the inner surfaces or the upper parts of the first and second cushions 30 and 40 for stable tether routing.

As illustrated in FIG. 24, while the eighth tether 69 is horizontally disposed on the inner surface of the connection part 50, both end parts of the seventh tether 68 may be fixed to the inner surfaces of the upper parts of the first and second cushions 30 and 40 in a sewing method, respectively.

To this end, a sewing part 71 sewed on the inner surfaces of the first cushion 30 and the second cushion 40 may be provided on both end parts of the eighth tether 69.

Of course, the present invention may also be changed so that a fixing member is installed at positions where the both end parts of the eighth tether are to be installed, respectively, and both ends of the seventh tether are fixed to each fixing member by sewing.

As such, according to the present invention, it is possible to implement stable tether routing by fixing both ends of the eighth tether on the inner surfaces of the upper parts of the first and second cushions and improve the lateral strength by limiting the deployment shape of the upper part of the airbag cushion.

Alternatively, as illustrated in FIG. 25, the eighth tether 69 is horizontally disposed in front of the connection part 50 to be spaced by a predetermined interval when the airbag cushion 20 is inflated and deployed, and both end parts of the eighth tether 69 may be fixed to the upper parts of the first and second cushions 30 and 40 in a sewing method, respectively.

As such, according to the present invention, it is possible to implement stable tether routing by fixing both ends of the eighth tether to the upper parts of the first and second cushions and further improve the lateral strength by limiting the deployment shape of the upper part of the airbag cushion.

Meanwhile, in the embodiments, it has been described that the airbag cushion is formed in a shawl shape, but the present invention is not necessarily limited thereto.

For example, FIG. 26 is a perspective view of a vehicular airbag device according to yet another embodiment of the present invention and FIG. 27 is a diagram illustrating a state in which the airbag cushion illustrated in FIG. 26 is installed on a seat.

In the present embodiment, a configuration of a vehicular airbag device 10 is the same as that of the vehicular airbag device 10 with reference to FIGS. 1 to 25 described above, but as illustrated in FIG. 26, the airbag cushion 20 may be formed in a cell shape instead of the shawl shape.

That is, the airbag cushion 20 is formed in the cell shape so as to surround entirely the head region of the occupant as well as both side surfaces and the front surface of the occupant.

To this end, the airbag cushion 20 having the cell shape according to the present embodiment may include first and second cushions 30 and 40 inflated and deployed at both sides of the occupant, and a third cushion 70 of which both sides are connected to the upper ends of the first and second cushions 30 and 40 and inflated and deployed to surround an upper surface, both side surfaces, a front surface, and a rear surface of the head region of the occupant.

As illustrated in FIG. 27, the third cushion 70 is installed on the backrest 12 of the seat 11 or in the headrest 13 of the seat 11, and may be inflated and deployed toward the upper surface, the both side surfaces, and the front surface and the rear surface of the head region from the rear side of the head region of the occupant in the event of the vehicle collision.

As such, according to the present invention, it is possible to safely protect the occupant in the event of the vehicle collision by applying the cell-like airbag cushion surrounding entirely the both side surfaces of the upper body and the head region of the occupant and limiting the deployment shape of the airbag cushion using the limiting means.

Hereinabove, the invention made by the present inventors has been specifically described according to the embodiments, but the present invention is not limited to the embodiments, and can be modified in various manners in the scope without departing from the gist.

INDUSTRIAL APPLICABILITY

The present invention is applied to a vehicular airbag device technique which safely protects an occupant by inflating and deploying an airbag cushion installed in a backrest of a seat to restrict both side surfaces and a front surface of the occupant around both shoulders of the occupant in the event of a vehicle collision.

The invention claimed is:

1. An airbag apparatus of a vehicle, the airbag apparatus comprising:
   an airbag cushion;

an inflator for generating gas by an impact detection signal upon a vehicle collision to supply the gas to the airbag cushion; and a defining device for defining a deployed shape of the airbag cushion, wherein the airbag cushion includes a first cushion deployable from a first lateral side of a backrest of a seat of the vehicle, a second cushion deployable from a second lateral side of the backrest, and a connection portion at a top of the airbag cushion laterally extending between and connecting the first and second cushions, both of the first and second cushions deployable from the backrest in forward, upward and down directions to protect an occupant of the seat in an event of a vehicle collision, wherein the defining device includes first and second tethers each having an upper end connected to front ends or lower ends of the first and second cushions, respectively, and a lower end connected to the seat proximate a front part of the seat and arranged to extend downward and forwardly from a respective one of the first and second cushions to the seat upon inflation and deployment of the first and second cushions.

2. The airbag apparatus of claim 1, wherein the defining device defines the deployed shape to prevent the first and second cushions deployed toward both sides of the occupant from spreading to both outer sides, in which the defining device is installed between the first and second cushions and the seat.

3. An airbag apparatus of a vehicle, the airbag apparatus comprising:

an airbag cushion deployed toward both sides and a front of a vehicle occupant to surround and restrain an entire upper body around both shoulders of the vehicle occupant upon vehicle collision;

an inflator for generating gas by an impact detection signal upon the vehicle collision to supply the gas to the airbag cushion; and a defining device for defining a deployed shape of the airbag cushion, wherein the airbag cushion is installed in a backrest of a seat on which the vehicle occupant sits, and includes first and second cushions inflated and deployed forward, upward and downward from both upper ends of the backrest, and the defining device defines the deployed shape to prevent the first and second cushions deployed toward both sides of the vehicle occupant from spreading to both outer sides, in which the defining device is installed between the first and second cushions and the seat, and wherein the defining device comprises at least two of:

a pair of first tethers having an upper end connected to front ends or lower ends of the first and second cushions and a lower end connected to the seat;

a pair of second tethers having an upper end connected to a non-inflated region formed in the first and second cushions and a lower end connected to the seat;

a pair of third tethers having an upper end connected to front ends of the first and second cushions and a lower end connected to the seat through through-holes formed in the first and second cushions;

a defining member having a central portion, which is disposed at a joint portion for connecting the first cushion to second cushion, configured to have a width wider than both end portions of the defining member, disposed along an outer surface of the airbag cushion, and having both ends connected to the seat; and a fourth tether alternately disposed on outer and inner surfaces of the airbag cushion and having both ends connected to the seat.

4. An airbag apparatus of a vehicle, the airbag apparatus comprising:

an airbag cushion which is formed in a shawl shape and is deployed toward both sides of an occupant to surround and confine an entire upper body, an abdomen and a pelvic portion around both shoulders of the occupant upon vehicle collision; and a restricting device installed on first and second cushions of the airbag cushion deployed toward both sides of the occupant and providing a supporting force to restrict a deployment shape when the first and second cushions are deployed, wherein the airbag cushion includes a first cushion deployable from a first lateral side of a backrest, a second cushion deployable from a second lateral side of the backrest, and a connection portion at a top of the airbag cushion laterally extending between and connecting the first and second cushions, both of the first and second cushions deployable from the backrest in forward, upward and down directions to protect an occupant of a seat of the vehicle in an event of a vehicle collision, wherein the restricting device is a continuous tether having first and second ends secured to the seat first and second sides of the continuous tether extending from the seat upwardly along a front surface of the first and second cushions, respectively, and extending upwardly and inwardly along a rear surface of the airbag cushion, the continuous tether further include a central portion disposed adjacent the front surface and connecting the first and second ends.

5. An airbag apparatus of a vehicle, the airbag apparatus comprising:

an airbag cushion;

an inflator for generating gas by an impact detection signal upon a vehicle collision to supply the gas to the airbag cushion; and a defining device for defining a deployed shape of the airbag cushion, wherein the airbag cushion includes a first cushion deployable from a first lateral side of a backrest of a seat of the vehicle, a second cushion deployable from a second lateral side of the backrest, and a connection portion at a top of the airbag cushion laterally extending between and connecting the first and second cushions, both of the first and second cushions deployable from the backrest in forward, upward and down directions to protect an occupant of the seat in an event of a vehicle collision, wherein the defining device includes first and second tethers both having an upper end connected to a non-inflated region formed in a respective one of the first and second cushions and a lower end connected to the seat, the first and second tethers both arranged to extend downward and forwardly from a respective one of the first and second cushions to the seat upon inflation and deployment of the first and second cushions, the first and second tethers both disposed an a laterally inside surface of the respective first and second cushion and both passing over inflated portions of the first and second cushions, respectively, from the upper end to the lower end, the non-inflated regions of the first and second cushions being spaced from a forward and lower perimeter of the first and second cushions, respectively.

6. An airbag apparatus of a vehicle, the airbag apparatus comprising:

an airbag cushion;
an inflator for generating gas by an impact detection signal upon a vehicle collision to supply the gas to the airbag cushion; and
a defining device for defining a deployed shape of the airbag cushion,
wherein the airbag cushion includes a first cushion deployable from a first lateral side of a backrest of a seat of the vehicle, a second cushion deployable from a second lateral side of the backrest and a connection portion at a to of the airbag cushion laterally extending between and connecting the first and second cushions, both of the first and second cushions deployable from the backrest in forward, upward and down directions to protect an occupant of the seat in an event of a vehicle collision, wherein the defining device is alternately disposed on outer and inner surfaces of the airbag cushion and includes a continuous tether having first and second ends connected to the seat and a central portion is arranged on an outer surface of the airbag cushion at an upper end of the airbag cushion to connect the first cushion to the second cushion, first and second sides of the continuous tether both extending from the seat along the outer surface of the airbag cushion, passing through first and second holes in the first and second cushions, respectively, extending along an inner surface of the airbag cushion, passing through third and fourth holes in the first and second cushion, respectively, and extending along the outer surface of the airbag cushion to the connection portion, the continuous tether fixed to the connection portion.

7. An airbag apparatus of a vehicle, the airbag apparatus comprising:
an airbag cushion which is formed in a shawl shape and is deployed toward both sides of an occupant to surround and confine an entire upper body, an abdomen and a pelvic portion around both shoulders of the occupant upon vehicle collision; and
a restricting device installed on first and second cushions of the airbag cushion deployed toward both sides of the occupant and providing a supporting force to restrict a deployment shape when the first and second cushions are deployed,
wherein the airbag cushion includes a first cushion deployable from a first lateral side of a backrest, a second cushion deployable from a second lateral side of the backrest, and a connection portion at a top of the airbag cushion laterally extending between and connecting the first and second cushions, both of the first and second cushions deployable from the backrest in forward, upward and down directions to protect an occupant of a seat of the vehicle in an event of a vehicle collision, and
wherein the restricting device a continuous tether having first and second ends coupled to one of the backrest and the seat, the first and second ends both fixed symmetrically to each other at one of a bottom or a center portion of a frame at both sides of the backrest, an inflator stud and both sides of a seat frame, or fixed in mutually different positions, wherein the continuous tether is obliquely disposed rearward and upward along an outer surface of the second cushion, inserted into the airbag cushion through an upper end of the second cushion or one side end of a connecting portion that connects upper ends of the first and second cushions, horizontally installed along an inner surface of the connecting portion, drawn out to an outside of the airbag cushion through the upper end of the first cushion or the other side end of the connecting portion, and inclined forward and downward along an outer surface of the first cushion.

8. An airbag apparatus of a vehicle, the airbag apparatus comprising:
an airbag cushion which is formed in a shawl shape and is deployed toward both sides of an occupant to surround and confine an entire upper body, an abdomen and a pelvic portion around both shoulders of the occupant upon vehicle collision; and
a restricting device installed on first and second cushions of the airbag cushion deployed toward both sides of the occupant and providing a supporting force to restrict a deployment shape when the first and second cushions are deployed,
wherein the airbag cushion includes a first cushion deployable from a first lateral side of a backrest, a second cushion deployable from a second lateral side of the backrest, and a connection portion at a top of the airbag cushion laterally extending between and connecting the first and second cushions, both of the first and second cushions deployable from the backrest in forward, upward and down directions to protect an occupant of a seat of the vehicle in an event of a vehicle collision,
wherein the restricting device is a continuous tether having first and second ends fixed to the first cushion and the second cushion, respectively,
wherein the continuous tether is horizontally disposed on an inner surface of the connecting portion that connects upper end portions of the first cushion and the second cushion, and horizontally disposed on upper end portions of the first cushion and the second cushion such that the continuous tether is spaced apart from a front of the connecting portion by a predetermined interval when the airbag cushion is deployed, and
wherein the first and second ends of the continuous tether are fixed to the first cushion and the second cushion, respectively in a sewing manner and free from the airbag cushion between the first and second ends.

* * * * *